United States Patent
Jones et al.

(10) Patent No.: US 10,321,632 B2
(45) Date of Patent: Jun. 18, 2019

(54) CROP-PACKAGE TRANSFER SYSTEM

(71) Applicant: DEERE & COMPANY, Moline, IL (US)

(72) Inventors: Austin J. Jones, Ottumwa, IA (US); Henry D. Anstey, Ottumwa, IA (US); Jeremy M. Erdmann, Floris, IA (US)

(73) Assignee: Deere & Company, Moline, IL (US)

( * ) Notice: Subject to any disclaimer, the term of this patent is extended or adjusted under 35 U.S.C. 154(b) by 861 days.

(21) Appl. No.: 14/748,676

(22) Filed: Jun. 24, 2015

(65) Prior Publication Data
US 2016/0374269 A1 Dec. 29, 2016

(51) Int. Cl.
| | |
|---|---|
| *A01D 90/12* | (2006.01) |
| *A01D 90/08* | (2006.01) |
| *A01F 15/08* | (2006.01) |
| *A01D 85/00* | (2006.01) |
| *A01F 15/07* | (2006.01) |

(52) U.S. Cl.
CPC ............ *A01D 90/12* (2013.01); *A01D 85/005* (2013.01); *A01D 90/083* (2013.01); *A01F 15/0883* (2013.01); *A01D 2085/007* (2013.01); *A01F 2015/0735* (2013.01)

(58) Field of Classification Search
CPC ............ A01F 2017/074; A01F 15/0875; A01F 15/0883; A01D 90/12; A01D 90/083; A01D 2085/007; A01D 90/10; A01D 41/1217; A01D 90/00
USPC .......... 53/116, 118, 211, 587, 588; 414/24.5, 414/24.6, 111, 509, 514–517; 100/3, 15, 100/87–89, 100; 56/341
See application file for complete search history.

(56) References Cited

U.S. PATENT DOCUMENTS

| | | | | |
|---|---|---|---|---|
| 2,286,278 A | * | 6/1942 | Huddle .................. | A01D 87/02 414/679 |
| 2,298,747 A | * | 10/1942 | Agar ........................ | B65F 3/24 414/492 |
| 2,876,917 A | * | 3/1959 | King ...................... | A01D 90/00 414/469 |
| 3,012,648 A | * | 12/1961 | Spilliaert ............ | A01F 15/0875 100/7 |

(Continued)

FOREIGN PATENT DOCUMENTS

| | | |
|---|---|---|
| DE | 3304166 A1 | 8/1984 |
| WO | 9904612 A1 | 2/1999 |

(Continued)

OTHER PUBLICATIONS

European Search Report dated Oct. 28, 2016 for Application No. 16175520.2.

*Primary Examiner* — Alexander M Valvis
*Assistant Examiner* — Lucas E. A. Palmer
(74) *Attorney, Agent, or Firm* — Klintworth & Rozenblat IP LLP

(57) ABSTRACT

A crop-package transfer system has a flexible member supported by a support frame and is configured to support a crop package on a first side of the flexible member. A motive member is disposed on a second side of the flexible member. An actuator device is configured to move the motive member along the second side of the flexible member, such that the motive member transmits motive force from the actuator device to the crop package via the flexible member.

19 Claims, 13 Drawing Sheets

(56) References Cited

U.S. PATENT DOCUMENTS

| | | | | |
|---|---|---|---|---|
| 3,286,862 A * | 11/1966 | Hansen | A01D 90/10 | 198/314 |
| 3,443,703 A * | 5/1969 | Matsumoto | B60P 1/006 | 414/510 |
| 3,528,564 A * | 9/1970 | Fischer | A01D 90/00 | 414/501 |
| 3,599,806 A * | 8/1971 | Fishcher | A01D 90/00 | 414/789.4 |
| 3,985,253 A * | 10/1976 | Kannady | A01D 87/127 | 298/5 |
| 4,077,315 A * | 3/1978 | Meiers | A01F 15/07 | 100/88 |
| 4,101,081 A * | 7/1978 | Ritter | A01D 90/083 | 241/101.74 |
| 4,277,220 A * | 7/1981 | Wiley | B60P 1/006 | 296/100.01 |
| 4,505,632 A * | 3/1985 | Quenzi | E02F 3/352 | 414/510 |
| 4,534,285 A * | 8/1985 | Underhill | A01F 15/0705 | 100/88 |
| 4,541,570 A * | 9/1985 | Rieke | A01D 90/12 | 222/627 |
| 4,683,815 A * | 8/1987 | Van Ryswyk | A01F 15/0883 | 100/188 R |
| 4,742,880 A * | 5/1988 | Schrag | A01F 15/0875 | 177/136 |
| 4,791,865 A * | 12/1988 | Naaktgeboren | A01F 15/0825 | 100/188 R |
| 4,815,266 A * | 3/1989 | Ratzlaff | A01D 90/083 | 56/341 |
| 4,972,656 A * | 11/1990 | Haugstad | A01F 15/071 | 53/176 |
| 5,156,518 A * | 10/1992 | VanMatre | B60P 1/006 | 414/507 |
| 5,211,345 A * | 5/1993 | Siebenga | A01D 87/127 | 119/57.91 |
| 5,385,001 A * | 1/1995 | Ramer | A01F 15/071 | 53/211 |
| 5,442,893 A * | 8/1995 | Soderberg | A01F 15/071 | 53/211 |
| 5,496,144 A * | 3/1996 | Wetz | A01D 87/127 | 414/24.5 |
| 5,760,344 A * | 6/1998 | Esken | A01F 15/0875 | 177/136 |
| 5,822,967 A * | 10/1998 | Hood | A01F 15/071 | 100/5 |
| 5,829,233 A | 11/1998 | Stirling | | |
| 6,033,179 A * | 3/2000 | Abbott | B60P 1/00 | 414/527 |
| 6,341,470 B1 * | 1/2002 | Lacey | A01F 15/071 | 53/176 |
| 6,457,295 B1 * | 10/2002 | Arnold | A01F 15/0833 | 177/135 |
| 6,607,342 B1 * | 8/2003 | Tolzin | A01D 90/08 | 414/111 |
| 8,522,513 B2 * | 9/2013 | Reijersen Van Buuren | A01F 15/071 | 53/118 |
| 2003/0024407 A1 * | 2/2003 | Ehrenpfort | A01F 15/071 | 100/8 |
| 2004/0031402 A1 * | 2/2004 | Viaud | A01F 15/0883 | 100/88 |
| 2004/0103632 A1 * | 6/2004 | Derscheid | A01F 15/0883 | 56/341 |
| 2004/0134177 A1 * | 7/2004 | Viaud | A01F 15/071 | 56/341 |
| 2005/0220572 A1 * | 10/2005 | Roosma | A01D 87/122 | 414/24.6 |
| 2008/0041028 A1 * | 2/2008 | Viaud | A01F 15/0883 | 56/341 |
| 2009/0162169 A1 * | 6/2009 | Kenna | A01D 90/10 | 414/25 |
| 2010/0024357 A1 * | 2/2010 | Viaud | A01F 15/071 | 53/116 |
| 2012/0204738 A1 * | 8/2012 | Reijersen Van Buuren | A01F 15/0705 | 100/40 |
| 2012/0324830 A1 * | 12/2012 | Reijersen Van Buuren | A01F 15/071 | 53/203 |
| 2013/0074709 A1 * | 3/2013 | Thompson | A01F 15/0883 | 100/7 |
| 2013/0078074 A1 * | 3/2013 | Millsap | A01D 85/005 | 414/789.3 |
| 2013/0133530 A1 * | 5/2013 | Roberge | A01F 15/0883 | 100/88 |
| 2014/0174304 A1 * | 6/2014 | Blough | A01F 15/0883 | 100/76 |
| 2014/0261022 A1 * | 9/2014 | Smith | A01F 15/0883 | 100/40 |
| 2015/0373915 A1 * | 12/2015 | Roberge | A01F 15/0705 | 56/341 |
| 2016/0135375 A1 * | 5/2016 | Smith | A01F 15/07 | 56/341 |
| 2016/0150734 A1 * | 6/2016 | Vanhoutte | A01F 15/0875 | 56/343 |
| 2017/0027107 A1 * | 2/2017 | De Jong | A01F 15/0883 | |
| 2017/0290269 A1 * | 10/2017 | Jones | A01D 90/10 | |
| 2017/0359960 A1 * | 12/2017 | Reijersen van Buuren | A01F 15/0715 | |

FOREIGN PATENT DOCUMENTS

| | | | | |
|---|---|---|---|---|
| WO | | 2013157948 A1 | 10/2013 | |
| WO | WO | 2013157948 A1 * | 10/2013 | A01F 15/071 |

* cited by examiner

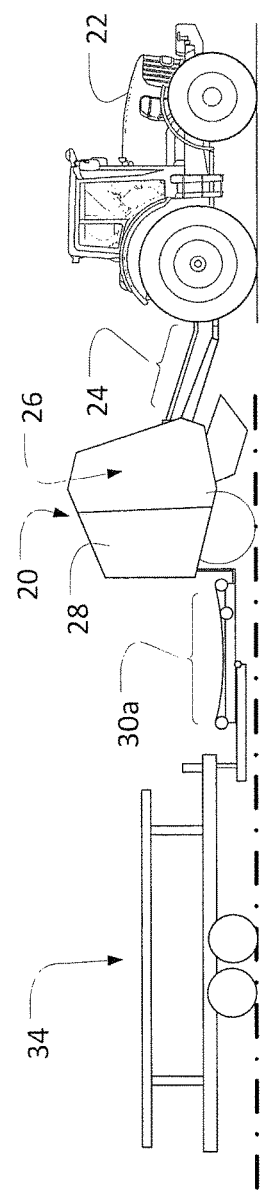
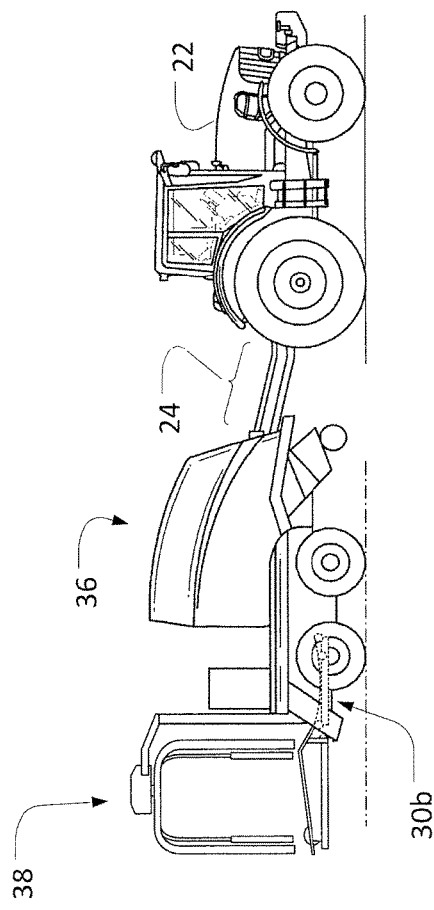

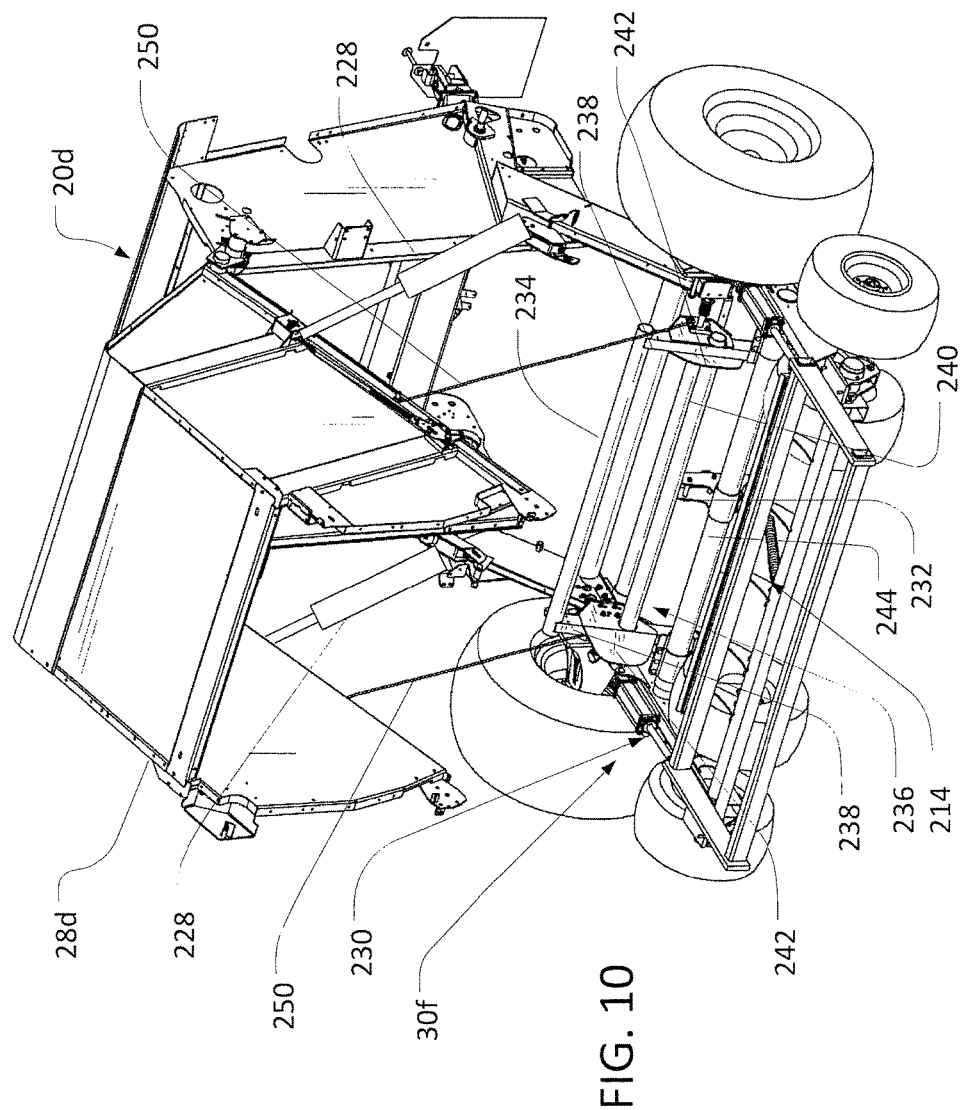

CROP-PACKAGE TRANSFER SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to transport of agricultural crop packages (e.g., bales), including transfer of crop packages from a crop-packaging device (e.g., a baler) to a trailing attachment or other device.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a baler may be pulled by a tractor along a windrow of cut material and may gather the material from the windrow. The material may then be passed into a packaging (e.g., baling) chamber for formation into a crop package (e.g., a bale). In various configurations, such a crop package may be generally cylindrical in shape and may be typically referred to as a "round" bale. Similarly, a baler that forms a round bale may be referred to as a "round" baler.

Once formed, a bale (or other crop package) may be ejected from the baling chamber of the baler (or other crop-packaging device). In known round balers, for example, a rear gate to the baling chamber may open (e.g., by pivoting backward and vertically upward), such that a formed bale may move backward (and typically fall downward) out of the baling chamber. In certain operations, bales (or other crop packages) may be wrapped with wrap material before (or after) being ejected from the baling (or other packaging) chamber. Such wrapping may be useful, for example, to provide a degree of surface protection and for structural integrity.

Known round balers (and other crop-packaging devices) typically eject a formed bale (or other crop packages) from the baling chamber before forming another bale. As such, formed bales may be ejected from the baling chamber (and the baler) relatively far from a preferred location for bale storage or use. To more appropriately locate bales or sets of bales, it may accordingly be useful to transport bales in various ways once the bales leave the baler. However, because of the significant weight of a formed bale and the susceptibility of the bales and wrap material to damage (e.g., surface damage due to rough handling), transport of formed bales may require significant effort and introduce various complications to farm operations.

In known operations, a bale accumulator or similar device may be utilized, in order to transport multiple bales to various locations. A bale accumulator may include, for example, a raised bed to support multiple bales during transport, and may be configured to receive formed bales onto the bed for transport, after the bales are ejected from the baling chamber. In other operations, other attachments or devices may be similarly (or otherwise) configured to receive a bale from a baler for transport or processing.

SUMMARY OF THE DISCLOSURE

A crop-package transfer system is disclosed for transporting bales of crop (and other) material.

According to one aspect of the disclosure, a crop-package transfer system is configured to support a crop package on a first side of a flexible member supported by a support frame. A motive member may be disposed on a second side of the flexible member. An actuator device may be configured to move the motive member along the second side of the flexible member, such that the motive member may transmit motive force from the actuator device to the crop package via the flexible member.

In certain embodiments, the support frame may be configured to trail behind a rear gate of a crop-packaging device, such that a crop package ejected from the crop-packaging device moves onto the flexible member. The motive member may move the crop package along the flexible member over at least one of a rearward path and a vertically upward path.

In certain embodiments, the motive member may include a roller or bar configured to move along the second side of the flexible member. A second motive member may be disposed on the second side of the flexible member, and the actuator device may be configured to move the second motive member along the second side of the flexible member to transmit motive force from the actuator device to the crop package via the flexible member.

In certain embodiments, the support frame may include one or more rigid members configured to support the crop package. As the actuator device moves the motive member along the second side of the flexible member, the motive member may move the crop package along the rigid members. The first and second motive member may transmit motive force from the actuator device to move the crop package in first and second directions.

In certain embodiments, a working length of the flexible member with respect to the support frame may increase as the motive member moves the crop package. A first end of the flexible member may be attached to the support frame with a rolling member, such that the flexible member unrolls from the rolling member as the motive member moves the crop package. A biasing assembly may apply tension to the flexible member to resist the increase in the working length of the flexible member.

In certain embodiments, an attachment member is attached to a crop-packaging device and is configured to transmit the motive force from the actuator device to the motive member. The attachment member may be attached to a rear gate of the crop-packaging device, and the actuator device may be configured to move the rear gate, in order to move the motive member via the attachment member. An intermediate member may be attached to the support frame or the crop-packaging device, such that the attachment member transmits motive force from the actuator device to the motive member via the intermediate member. The intermediate member may be pivotally attached to the support frame or the crop-packaging device and may move the motive member in an arcuate path.

In certain embodiments, the crop-package transfer system is configured to receive and support the crop package on a first side of a second flexible member supported by the support frame. The motive member may be disposed on the first side of the second flexible member, such that as the motive member transmits motive force to the crop package via the flexible member, the motive member may not transmit motive force to the crop package via the second flexible member. The second flexible member may be configured to move relative to the flexible member, in order to tilt or turn the crop package.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 1B is a side view of another embodiment of the work vehicle, crop packaging device, and crop-package transfer system of FIG. 1A, with a trailing accumulator;

FIG. 1C is a side view of another embodiment of the work vehicle, crop packaging device, and crop-package transfer system of FIG. 1A, with a wrapping device;

FIG. 10 is a perspective view of another example baler and crop-package transfer system, with a rear gate of the baler open for ejection of a formed bale;

Like reference numerals in the drawings indicate like components, parts, or operations.

DETAILED DESCRIPTION

Figure 1A:
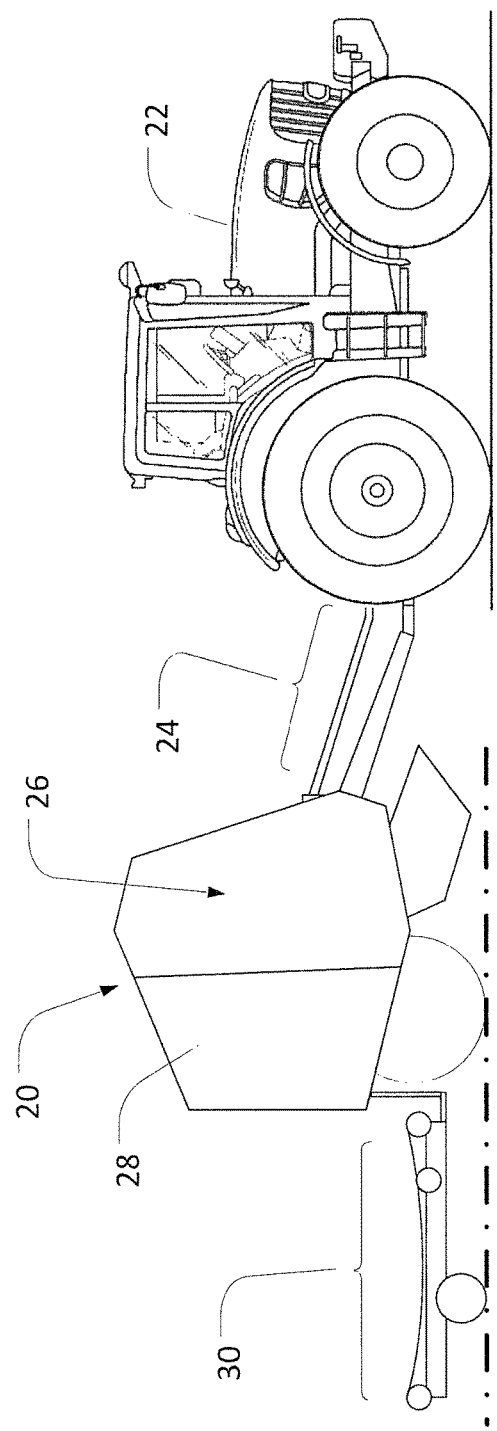
FIG. 1A is a side view of an example work vehicle, crop-packaging device, and crop-package transfer system.

The following describes one or more example implementations of the disclosed system and method, as shown in the accompanying figures of the drawings described briefly above.

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

Also as noted above, it may be useful in various instances to move formed bales to other locations, once the bales are ejected from a baling chamber. The disclosed crop-package transfer system may assist in these (and other) operations.

Various examples below may refer to components of a crop-package transfer system (or other components) as "ahead of," or "behind" various reference components. Such examples may refer to a configuration in which the crop-package transfer system is disposed behind a packaging (e.g., baling) chamber and ahead of a trailing attachment or other device, such as an accumulator or wrapping device. It will be understood that similar principles to those discussed below may also be applied to other configurations, including configurations in which the attachment or other device (e.g., the accumulator) or the crop-package transfer system are disposed along side of (or in other relation to) the relevant baler.

In various examples below, various embodiments are presented for use with a crop-packaging device configured as a round baler. As such, in examples below, various crop-packages may be referred to as "bales" or "round bales." It will be understood, however, that the disclosed crop-package transfer system may be utilized with a variety of crop packages and, in various embodiments, with a variety of crop-packaging devices.

Various examples below discuss a crop-package transfer system for use with an accumulator that generally trails behind the crop-package transfer system or an associate crop-packaging device. This context is presented as an example only. Accordingly, it will be understood that the disclosed crop-package transfer system may be used with other attachments or devices, including processing devices such as wrapping devices (e.g., a wrapping device integrated with or trailing behind a baler).

In certain operations, as noted above, an accumulator (or other device) may trail behind a baler along a field, in order to receive bales from the baler and transport the bales to other locations. Such an accumulator may (or other device) be configured as an integral portion of the baler itself, or may be configured as a separate device, such as a towed trailer or self-propelled vehicle. Various accumulators may include a bed configured to support one or more bales at a time for transport.

Devices such as accumulators may be useful to transport bales to various destinations once the bales are loaded onto the accumulator bed, and other devices may be useful for transport and other operations (e.g., for wrapping formed bales). However, an ejected bale may need to be moved (i.e., transferred) in order to be loaded onto the accumulator bed or other device platform. For example, in order to open a sufficiently large ejection passage for a formed (and, in certain implementations, wrapped) bale to exit the baling chamber, a rear gate to a baler may be configured with certain dimensions. Accordingly, in order to avoid a collision between the gate and a trailing device (or bales carried thereupon) during the operation of the gate, the device may be required follow the baler at a relatively large distance. Further, in order to provide sufficient clearance for uneven terrain, it may be necessary to dispose the bale-receiving platform of the device (e.g., the accumulator bed or wrapping platform) a certain distance above the ground.

Due to these (and other) considerations, a bale may need to be ejected from a baling chamber onto a structure other than the bale-receiving platform (or other apparatus or feature), then moved relative to the baler in order to reach the bale-receiving platform (or other apparatus or feature). As such, a crop-package transfer system may include a support frame configured to receive and support a bale, with the support platform being separated from the bale-receiving platform of the associated transport or processing device (e.g., accumulator bed or wrapping platform).

In certain embodiments, a crop-package transfer system may include a support frame disposed relatively low to the ground and forward of a trailing device (or bale-receiving platform thereof), so that operation of the baler gate is not impeded by the support frame or the accumulator. When ejected from the baling chamber, a bale may accordingly fall from a baling chamber onto the support frame, rather than the bale-receiving platform (e.g., accumulator bed. The bale may then need to be moved upwardly (e.g., vertically), at least in part, to reach the bale-receiving platform for further transport or processing.

A support frame for a crop-package transfer system may be configured in various ways. In certain embodiments, a support frame may be formed as part of a baler. For example, a support frame may be configured as a rigid frame extending rearward from the body of the baler behind (and below) the baler gate. In certain embodiments, a support frame may be formed as part of an accumulator or other device. For example, a support frame may be configured as a rigid frame extending forward of the bed of an accumulator (and behind and below the baler gate). In certain embodiments, a support frame may be formed as a stand-alone frame. For example, a support frame may be formed as part of a chassis of a trailer, which may be configured to be towed over a field by a baler, pushed over a field by an accumulator or other device, or otherwise moved with a baler to receive formed bales.

Even when a relatively small clearance is provided between the ground and the relevant bale-receiving platform (e.g., accumulator bed or wrapping platform), a bale that has been ejected from a baling chamber may still need to be lifted in order to reach the platform. For example, in various accumulators, a raised member (e.g., a raised bar) may be provided at the front of the accumulator bed (or elsewhere). Such a member may prevent bales that have already been loaded onto the bed from rolling off of the accumulator. Additional bales to be loaded onto the bed, however, may need to be lifted somewhat to clear the raised member in order to reach the bed.

In certain configurations, other movement of a bale (e.g., other movement prior to, or as part of, transport of the bale by an accumulator) may be useful. For example, whether an accumulator is utilized or not, after ejection of a bale from a baling chamber, it may be necessary to move the bale rearward, relative to the baler. For example, even where an accumulator is not utilized it may be useful to move an ejected bale rearward, in order to allow a gate to the baling chamber to close. As another example, where an accumulator is configured to trail relatively far behind a baler (e.g., in order to avoid collision with the baler gate), a bale may also need to be moved rearward after leaving the baler, in order to be loaded onto the bed of the accumulator. Likewise, bales may need to be moved upward (e.g., vertically) after ejection from the baling chamber, for wrapping or for various other reasons, including those discussed above.

In certain embodiments, a crop-package transfer system may include one or more flexible members supported by the support frame of the crop-package transfer system. Such flexible members may be configured to support a bale, at least in part, with respect to the support frame. In certain embodiments, the flexible members may be disposed relative to a baling chamber such that a formed (and, in certain implementations, wrapped) bale that is ejected from the baling chamber passes onto and is supported by the flexible members. A flexible member, for example, may be disposed on a support frame below and behind a baling chamber, such that a bale ejected from the baling chamber falls by gravity onto the flexible member. As used herein, the portion of a flexible member that faces a bale when a bale is supported by the flexible member may be referred to as a "support surface."

In certain embodiments, a flexible member may be configured as a belt or sheet of rubber or other material, or as a plurality of pivotal links (e.g., a track or conveyor, or plastic or other chain), as a strap of various materials. It will be understood, however, that other configurations are also possible. In certain embodiments, multiple flexible members may be utilized, various subsets of which may be configured differently from others. For example, certain flexible members may exhibit different resting tension (or slackness) than others. Similarly, various flexible members may be attached to the relevant support frame in different ways. In certain embodiments, a single flexible member may be attached to a support frame at one end with a first connection type (e.g., with a fixed connection such as a pin or clamp) and may be attached to the support frame at another end with a different connection type (e.g., with an extendable connection such as a spool or other rolling member).

In certain embodiments, the flexible members may collectively support the entire weight of the bale. In certain embodiments, the flexible members may support only a portion of the weight of the bale, or may support the weight of the bale only at certain times. In certain embodiments, certain flexible members may be configured to support a different portion of the weight of a bale than other flexible members, or may be configured to support a bale at different times (or in different positions) than other flexible members.

A crop-package transfer system may further include a motive member for moving a bale supported by the flexible members. With a bale supported by one or more flexible members, for example, a motive member may be configured such that the motive member is disposed on a different side of one or more of the flexible members than the bale. In certain embodiments, a motive member may be disposed on a side of the flexible members that is opposite the relevant support surfaces of the flexible members, such that the motive member, when moved, contacts the bale via the flexible members. For example, for a flexible member such as a rubber belt (or other flexible strap) that is configured to support a bale on an upward-facing support surface, a motive member may be disposed, at least in part, below the rubber belt (or strap) and in contact with a downward facing surface of the belt (or strap). In certain embodiments, a motive member may be configured as a bar, or another relatively rigid member. In certain embodiments, a motive member may be configured as a rotatable body, such as a roller configured to roll along the relevant flexible members when the motive member is moved.

An actuator device may be configured to move the motive member, relative to the flexible member and relative to a bale supported by the flexible member. In this way a bale may be moved rearward and vertically upward with respect to the baler by the actuator device and the motive member, as may be useful, for example, for loading the bale onto the bed of a trailing accumulator. For example, a hydraulic cylinder or spring assembly may be configured to move a motive member rearward and vertically upward when actuated. In various configurations, this may cause the motive member also to move the bale rearward and vertically upward, via the flexible member. In this way, for example, a bale ejected from a baling chamber onto the crop-package transfer system may be moved rearward to clear the baler gate and vertically upward to reach the bed of a trailing accumulator (or other structure) via the actuator device, motive member and flexible member.

Because the motive member may contact the bale via the flexible member (at least over the portion of the bale that is directly supported by the flexible member), the motive member may provide motive force to the bale indirectly, via the flexible member. In various operations, this may provide additional benefits beyond the rearward and vertically upward movement of the bale. As noted above, for example, bales (and wrap material of wrapped bales) may be susceptible to damage during bale transport. The interposition of one or more flexible member between the motive member and a particular bale, may cause the bale to roll along the flexible member under the force of the motive member. This may result in decreased likelihood of damage to the bale (and to any wrap material) as the bale is transferred than if, for example, the bale were to slide rather than roll.

In certain embodiments, an actuator device may move a motive member directly. For example, a hydraulic (or other) actuator may be mounted to the support frame of a crop-package transfer system and may be configured to move a motive member that is also mounted (e.g., pivotally mounted) to the support frame. Similarly, in certain embodiments, a hydraulic (or other) actuator may be configured to move a gate of the baler, and an attachment member (e.g., a link of a linkage, a chain, a cable, a bar, a beam, and so on) may transmit force from the gate to the motive member.

In certain embodiments, an actuator device may move a motive member indirectly. For example, a hydraulic (or other) actuator may move an intermediate member (e.g., an arm for a push bar that is pivotally attached to a baler) and the intermediate member may in turn activate a pivoting (or other) arm attached to the support frame to move the motive member.

As noted above, in certain embodiments, a motive member may be rotatable. For example, a motive member may be configured as a roller supported at either end by pivoting attachments, such that the roller may rotate along the flexible member as the actuator device moves the roller to move the bale.

Also as noted above, in certain embodiments, multiple flexible members may be provided. For example, a set of parallel flexible members may be provided, such that a bale may be supported by multiple flexible members (or multiple portions of a single flexible member) simultaneously. In certain embodiments, various flexible members of a set may exhibit different characteristics. For example, a first subset of flexible members in a set may be relatively tightly suspended between attachment points and a second subset of flexible members in the set may be suspended between attachment points with a relatively large amount of slack. In certain embodiments, only a subset of flexible members in a set may be moved by the motive member to move the bale. For example, a first, relatively tightly suspended subset of flexible members may support a bale when the bale is first received on the support frame. This first subset of flexible members, however, may not be configured to be moved by the motive member to move the bale. Rather, a second, relatively slackly suspended subset of flexible members may be configured to be moved by the motive member to move the bale. In other arrangements, otherwise configured subsets of flexible members may be configured to variously support, or support and move, a bale.

In certain embodiments, a parallel, latticed, or other arrangement of flexible members (or other members) may be disposed on a frame. In this way, for example, openings may be provided between a bale and the an area below (e.g., the ground) when the bale is supported by the crop-package transfer system (e.g., is supported by the various flexible members). Accordingly, loose material (e.g., dirt and debris, material falling free of various bales, and so on) may fall to the area below (e.g., the ground) the crop-package transfer system rather than contribute to clogging or fouling various operations.

Various configurations may be utilized to provide such openings for passage of loose material to the ground. For example, various crop-package transfer systems may include two sets of flexible members, with one set disposed in parallel with (or transverse to) the other and with the two sets of flexible members collectively defining various openings between a supported bale and the ground. As another example, various crop-package transfer systems may include a lattice (or parallel) arrangement of flexible members and rigid members. For example, a set of parallel belts for supporting and moving a bale may be interspersed with an arrangement of parallel (or transverse) rigid members (e.g., rigid bars), wherein the rigid members may provide support to the bale relative to the ground, but may not be configured to actively move the bale relative to the support frame.

Also as noted above, in certain embodiments, one or more ends of the various flexible members may be fixed with respect to the frame and one or more ends of the various flexible members may be extendably attached to the frame. For example, one flexible member of a crop-package transfer system may be fixedly attached to the frame at each end (e.g., pinned or clamped to the frame), such that change in working length of the flexible member results from the flexibility the flexible member itself. In contrast, another flexible member of a crop-package transfer system may be fixedly attached to the frame at one end, but coiled around a spring-loaded spool (or other rolling member) at another end, such that the flexible member may lengthen by unwinding from the spool. As used herein, a flexible member with at least one end extendably attached to the frame may be considered an extendably attached flexible member.

In certain embodiments, certain extendably attached flexible members (or extendably attached ends of flexible members) may change in working length as the motive member moves the bale via the flexible members. For example, a flexible member may be coiled around a spool (or other rolling member) attached to a motive member, such that as the motive member moves the flexible member to move the bale, the flexible member winds (or unwinds) on the spool and thereby changes in working length relative to the support frame. As another example, a flexible member may be coiled around a spool (or other rolling member) that is fixed relative to the frame. In such a configuration, as the motive member moves the flexible member to move the bale, the flexible member may also wind (or unwind) on the spool.

In certain embodiments, certain fixed flexible members (or fixed ends of flexible elements) may not move with the motive member (at least to the same degree as the extendably attached flexible members). In certain embodiments, both fixed and extendably attached flexible members may provide support for bales when the bales are received from the baling chamber, but only the extendably attached flexible members (and the motive member) may be moved by the motive member to transport the bales.

In certain embodiments, fixed and extendably attached flexible members may be disposed at the same height with respect to the ground, when not supporting a bale. In certain embodiments, extendably attached flexible members may be disposed relatively above fixed flexible members, when not supporting a bale (or vice versa). When loaded with a bale, such movable attached flexible members may then sink downward until the bale is also supported by the fixed flexible members (or vice versa).

Referring now to FIG. 1A, a crop-package transfer system may be utilized with respect to various balers, such as a round baler 20. The baler 20 is configured to be towed by a powered tractor 22 via a forward drawbar 24 or other connection device, and may include a rearwardly disposed hitch (not shown) or other connection device for attaching a trailing accumulator or other device. Material may be gathered from a field by the baler 20, and formed into round bales within a baling chamber 26. A gate 28 may be disposed at the rear of the baler, and configured to swing rearward and vertically upward to release a bale from the baling chamber 26.

A crop-package transfer system 30 may be configured to travel behind the baler 20, so as to receive bales that are ejected from the baling chamber 26. In certain embodiments, the crop-package transfer system 30 may be configured to travel between the baler 20 and a trailing accumulator or other device (not shown). In various embodiments, the crop-package transfer system 30 may be supported directly by the baler 20, may form part of an accumulator or other device (e.g., a wrapping device), or may be configured as a separate vehicle (e.g., a separate wheeled trailer). Various examples below may refer to configurations of the crop-package transfer system 30 for operation with the baler 20. It will be understood, however, that various crop-package transfer systems may also (or alternatively) operate with other balers (or crop-packing devices) or other vehicles.

FIG. 1B depicts another example configuration, in which a crop-package transfer system 30a trails behind the baler 20 and is, in turn, trailed by an accumulator 34. In some embodiments, the accumulator 34 may be connected to the crop-package transfer system 30a such that the accumulator may pivot relative to the crop-package transfer system 30a as the vehicle train travels over a field. In some embodiments, the crop-package transfer system 30a may be integrated with (or rigidly attached to) the accumulator 34, with the accumulator and crop-package transfer system 30a moving together with respect to the baler 20.

FIG. 1C depicts still another example configuration, in which a crop-package transfer system 30b is disposed between a baler 36 and a wrapping device 38. In such a configuration, bales released from the baler 36 may fall onto the crop-package transfer system 30b, and the device 30b may then lift the bales onto a raised platform of the wrapping device 38 so that the bales can be wrapped. As depicted, the baler 36, the crop-package transfer system 30b, and the wrapping device 38 are integrated into a single platform to be towed by the tractor 22. In other embodiments, one or more of the baler 36, the crop-package transfer system 30b, and the wrapping device 38 (or other configurations thereof) may be configured as separate platforms, which may be interconnected in various ways.

Figure 2:
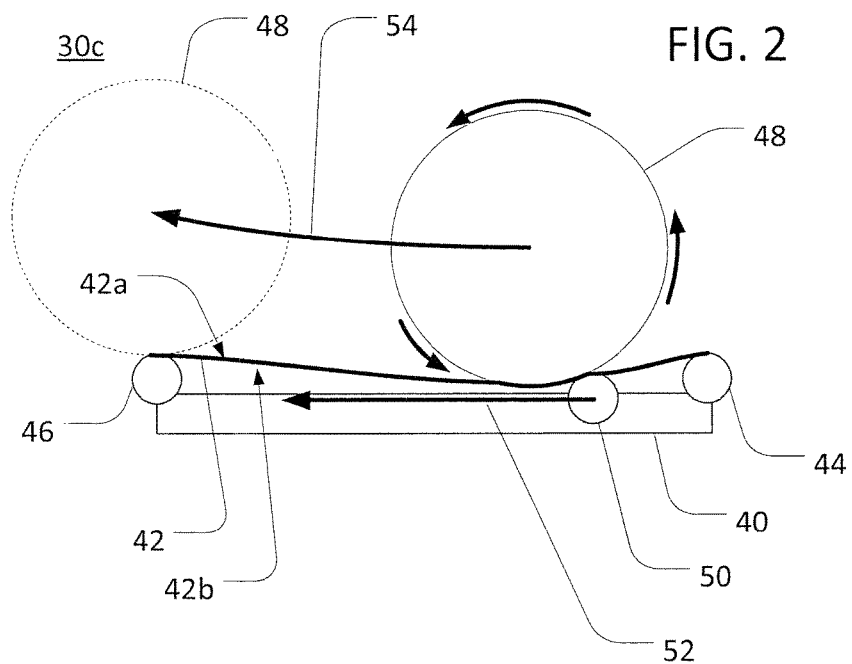
FIG. 2 is a side schematic view of another example embodiment of the crop-package transfer system of FIG. 1.

Referring also to FIG. 2, an example crop-package transfer system 30c includes a support frame 40, configured as a rigid metal frame. As depicted, the front end of the support frame 40 (e.g., the end at which a bale may be received) is disposed to the right. One or more flexible members 42 (e.g., one or more belts or straps) are secured to the support frame 40, extending between front and rear attachment points 44 and 46 at the front and rear ends, respectively, of the frame 40. The attachment points 44 and 46 may be configured as tubing, bars, rollers, beams, brackets, or otherwise. As depicted, the flexible members 42 extend the full length of the frame 40 between front and rear attachment points 44 and 46. It will be understood, however, that the flexible members 42 may extend various other distances between attachment points on the frame 40. As depicted in FIG. 2, the flexible members 42 are rigidly fixed to the frame at the attachment points 44 and 46, such that the flexible members 42 may lengthen by elastic deformation, but are not extendable through movement (e.g., unwinding) at the attachment points 44 and 46. It will be understood that other configurations are possible.

The flexible members 42 are attached to the support frame 40 such that a bale 48 may be supported on the flexible members 42 with respect to the support frame 40. (The bale 48 is depicted in solid relief in an initial position and in dotted relief in a later position, after the movement described below.) As depicted, the bale 48 rests on an upper support surface 42a of the flexible members 42 when the bale 48 is supported by the flexible members 42. As discussed in greater detail below, other portions of a crop-package transfer system 30 (including the specific system 30c) may also support a bale. For example, one or more rigid members of the support frame 40 (not shown) may also support the bale 48, at least in part.

A motive member 50 (e.g., a bar, roller, or other member) is disposed on an opposite side of the flexible members 42 from the bale 48. In an initial state, as depicted, the motive member 50 may be disposed below and to the front (i.e., to the right, as depicted) of the bale 48. (Like the bale 48, the member 50 is depicted in solid relief in an initial position and in dotted relief in a later position.) An actuator device (not shown) may be configured to move the motive member 50 rearward with respect to the support frame 40, such that the motive member 50 moves rearward (e.g., in the direction of arrow 52) along a side 42b of the flexible members 42 that is opposite the support surface 42a. In this way, the motive member 50 may be caused to impart a rearward motive force to the bale 48 via the flexible members 42. Accordingly, the bale 48 may be caused to also move rearward with respect to the support frame 40 (e.g., in the direction of arrow 54). In certain embodiments, because the motive member 50 is disposed along the side 42b of the flexible members 42 and the bale is disposed along the support surface 42a of the flexible members 42, the motive force applied to the bale 48 by the motive member 50 via the flexible members 42 may cause the bale 48 to generally move along the flexible members 42 by rolling rather than sliding. Accordingly, the possibility of damage to the bale surface (or to any wrap material) during transport may be reduced.

As discussed in greater detail below, various types of actuator assemblies may be utilized to move the motive member 50 (or motive members of other embodiments of the crop-package transfer system 30). For example, various embodiments may utilized one or more of a hydraulic assembly, a pneumatic assembly, a spring-loaded or other biasing assembly, a geared or other mechanical assembly, or other configuration of force transmission elements and devices in order to impart a motive force to the motive member and, thereby, to a bale supported by the flexible members. In certain embodiments, an actuator device may be supported by the support frame of the crop-package transfer system. In certain embodiments, an actuator device may be supported by a separate structure, such as the frame of a baler.

Figure 3:
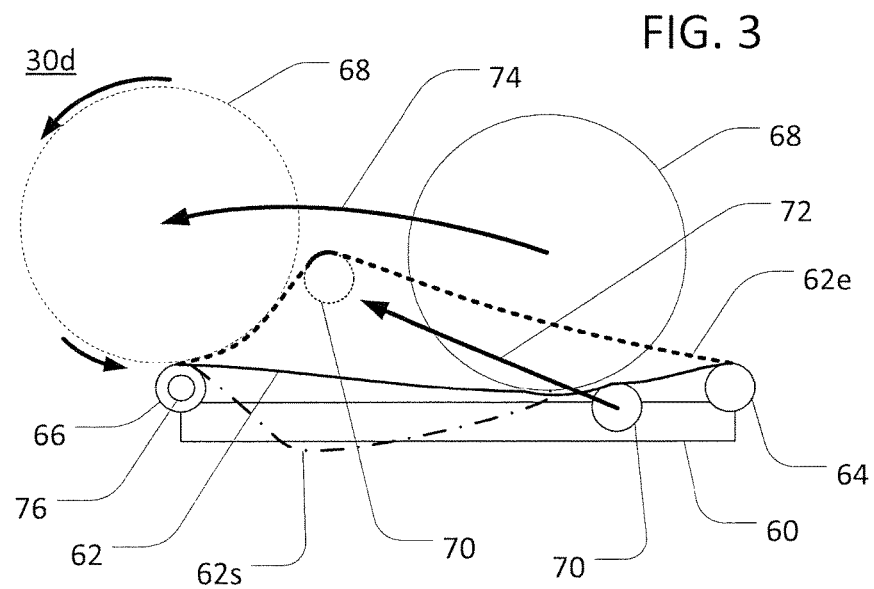
FIG. 3 is a side schematic view of another example embodiment of the crop-package transfer system of FIG. 1.

In certain embodiments, a motive member may be configured to move a bale vertically upward as well as (or as an alternative to) rearward. Referring also to FIG. 3, for example, a crop-package transfer system 30d is configured similarly to the crop-package transfer system 30c, with one or more flexible members 62 attached to a support frame 60 at front and rear attachment points 64 and 66, such that the flexible members 62 may support a bale 68 with respect to the support frame 60. (The bale 68 is depicted in solid relief in an initial position and in dotted relief in a later position, after the movement described below.) As in the bale transfer system 30c, a motive member 70 is disposed on an opposite side of the flexible members 62 from the bale 68, such that when an actuator device (not shown) moves the motive member 70, the motive member 70 imparts a motive force to the bale 68 via the flexible members 62.

As depicted in FIG. 3, the motive member 70 is configured to be moved by the actuator device (not shown) along a path that extends both rearward and vertically upward (e.g., along arrow 72). In this way, the bale 68 may also be moved both rearward and vertically upward with respect to the support frame 60 (e.g., along the arcuate path of arrow 74).

In certain embodiments, such vertically upward and rearward (or other) movement of a motive member (e.g., the motive member 70) may tend to elongate the relevant flexible members with respect to the support frame. Still referring to FIG. 3, for example, as the motive member 70 is moved from an initial position (depicted in solid relief) and a later position (depicted in dotted relief), the working length of the motive member 70 between the attachment points 64 (or as otherwise measured relative to the support frame 60) may be required to increase. This may be seen, for example, with reference to an extended configuration 62e of the flexible members 62. Such lengthening of the working length of the flexible members 62 may be accomplished in various ways.

In certain embodiments, various flexible members may be configured to elastically elongate, in order to accommodate movement of a motive member. For example, the flexible members 62 may be configured as rubber (or other) belts, such that the flexible members 62 may stretch into the extended configuration 62e when moved by the motive member 70. In certain embodiments, various flexible members may be secured to the support frame with an extendable connection, such as a spool or other rolling member. For example, the attachment point 66 may be configured as a spring-loaded (or other) spool 76 around which the flexible members 62 are initially wound. As the motive member 70 moves the flexible members 62 toward the extended configuration 62e, the flexible members 62 may accordingly unwind from the spool 76 in order to increase the effective working length of the flexible members 62 between the attachment points 64 and 66. As the motive member 70 is returned to its initial position, the flexible members 62 may then wind onto the spool 76 in order to decrease their working length. (In certain embodiments, a similar spool or other device may be provided at the attachment point 64.)

In certain embodiments, rather than (or in addition to) being configured to effectively lengthen during operation, various flexible members may be provided with a degree of initial slack to accommodate movement of a motive member. For example, the flexible members 62 may initially include a degree of slack as indicated by slackened configuration 62s. As such, the flexible members 62 may not need to lengthen (or may lengthen to a reduced degree) when moved to the extended configuration 62e by the motive member 70.

As depicted in FIGS. 2 and 3, the path of the motive members 50 and 70 may include a generally linear path (e.g., as shown by the arrows 52 and 72). In certain embodiments, various motive members may be configured to travel over non-linear paths to move a bale. For example, when pivotally attached to the support frame 60 with a pivoting arm (not shown), the motive member 70 may follow a generally arcuate path to move the bale 68. In certain embodiments, various linkages of one or more interconnected links may be utilized to prescribe a particular path for a motive member.

Figure 4A:
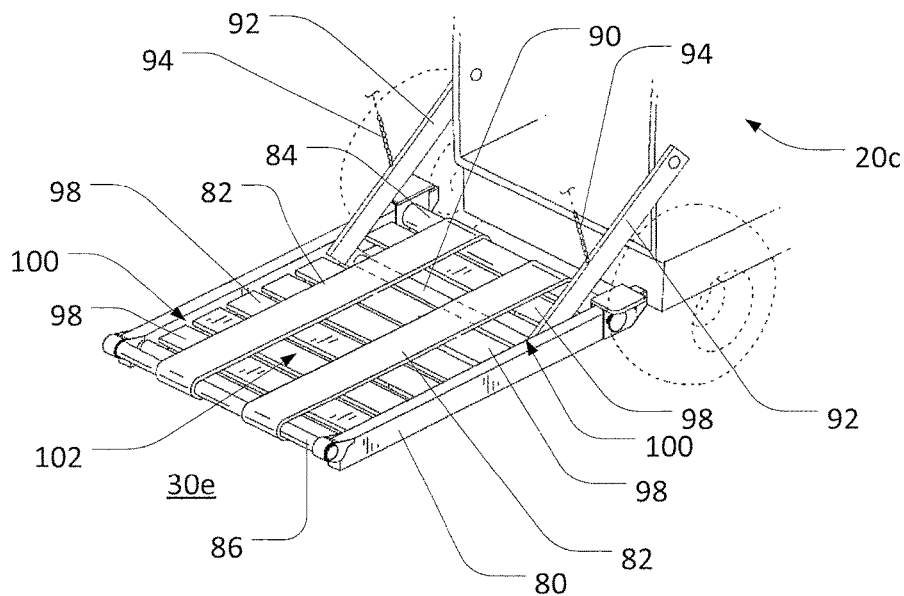
FIG. 4A is a perspective view of still another example embodiment of the crop-package transfer system of FIG. 1.
Figure 4B:
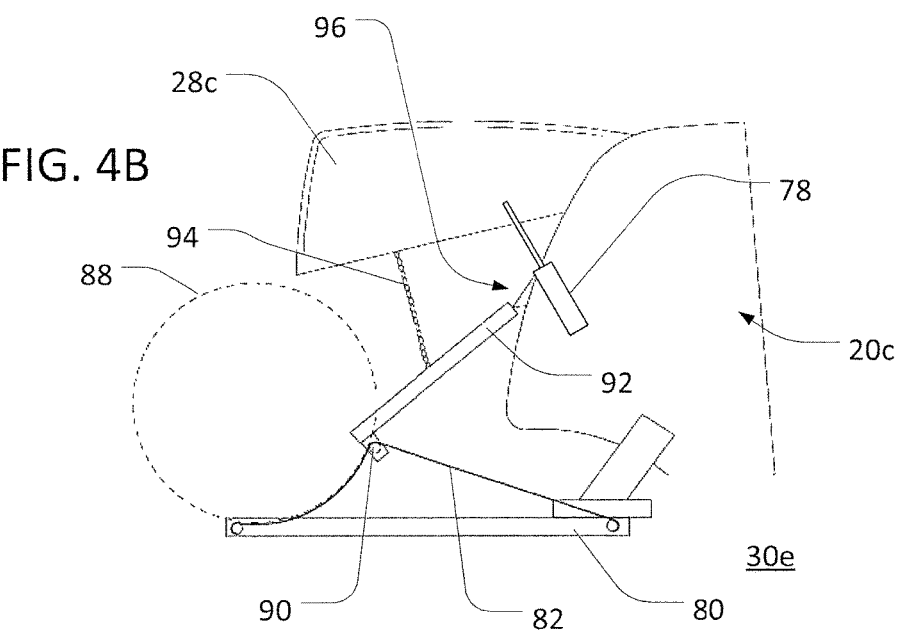
FIG. 4B is a side schematic view of an operation of the crop-package transfer system of FIG. 4A.

Referring also to FIGS. 4A and 4B, another example crop-package transfer system 30e includes a support frame 80 that is integrally attached to a baler 20c. A set of two flexible members 82, configured as flexible belts, are fixedly attached to the frame 80 at a forward attachment point 84 and are extendably attached to the frame at a rear attachment point 86 (e.g., configured as a roller or spool). In this way, a bale 88 ejected from the baler 20c by the rearward and vertically upward opening of a gate 28c (see FIG. 4B) may fall onto the flexible members 82 and be thereby supported by the flexible members 82 with respect to the support frame 80.

Referring in particular to FIG. 4B, a motive member 90 is configured as a roller supported by two pusher arms 92 of the baler 20c, which are pivotally attached to the body of the baler 20c. A chain 94 (or other attachment member, such as a rope, cable, linkage link, bar, beam, and so on) attaches the pusher arms 92 to the gate 28c of the baler 20c, such that when the gate 28c moves over a particular range the chain 94 transmits motive force to the arms 92 and, thereby, to the motive member 90. Accordingly, during operation, an actuator device, such as the hydraulic actuator 78, may swing the gate 28c of the baler 20c rearward and vertically upward in order to release a formed (and wrapped) bale 88 from baler 20c. The bale 88 may fall from the baler 20c onto the support frame 80, as supported by the flexible members 82. As the gate 28c pivots open over a particular range (e.g., over a range of movement after the bale has been fully released through the ejection passage 96 of the baler 20c), the chain 94 is pulled to a taut state, such that the chain 94 transmits motive force from the gate 28c to the arms 92 and the motive member 90. Accordingly, the actuator device (not shown) utilized to open the gate 28c to eject the bale 88 from the baler 20c may also be utilized to provide motive force to the motive member 90 and thereby move the bale 88, via the flexible members 82, along the support frame 80. An actuator device for moving the gate 28c may include, for example, various hydraulic (or other) actuators, which may be included in the baler 20c even in the absence of a crop-package transfer system.

In certain embodiments, various attributes of an attachment member may be configured to provide particular motive action to the relevant motive member. For example, the length or attachment point of the chain 94 with respect to the baler gate 28c and the arms 92 may be varied in order to provide particular timing and other characteristics of the movement of the motive member 90. As another example, a more complex set of attachment members (e.g., a multi-link linkage) may be utilized in order to provide a particular path of movement (e.g., an arcuate or other path) of the motive member.

Referring again, in particular, to FIG. 4A, the support frame 80 is configured to include a number of rigid members 98 extending transverse to the flexible members 82, between lateral sides members of the support frame 80. The rigid members 98 may provide various benefits during operation of the crop-package transfer system 30e. In certain implementations, the rigid members 98 may provide some support for the bale 88 with respect to the support frame 80 in addition to (or as an alternative to) the support provided by the flexible members 82. For example, when the bale 88 first falls from the baler 20c onto the support frame 80, the rigid members 98 may provide the primary support structure for the bale 88. The flexible members 82 may then provide support to the bale 88 primarily when the motive member 90 is used to move the bale 88 via the flexible members 82. In certain embodiments, the rigid members 98 may support the bale 88 during movement of the bale 88 by the motive member 90. For example, as the bale 88 is rolled rearward along the support frame 80 by the motive member 90 and flexible members 82, the rigid members 98 may continue to support a portion of the weight of the bale 88 with respect to the support frame 80 and the ground.

As depicted, the rigid members 98 are configured as metal slats or plates. It will be understood, however, that other configurations are possible. For example, rigid members of a support frame of a crop-package transfer system may be configured as bars or plates, as rollers, or in various other ways. As depicted in FIG. 4A, various spaces 100 may be provided between the various rigid members 98, which may effectively provide various openings between the bale 88 and the ground, when the bale 88 is supported by the crop-package transfer system 30e. As also discussed below, such spaces 100 (and the associated openings between the bale 88 and the ground) may allow material that is shed from the bale 88 during transport to fall to the ground, rather than excessively accumulate on the crop-package transfer system 30e. It can be seen a space 102, which may provide similar benefits, is also provided between the flexible members 82.

Figure 5:
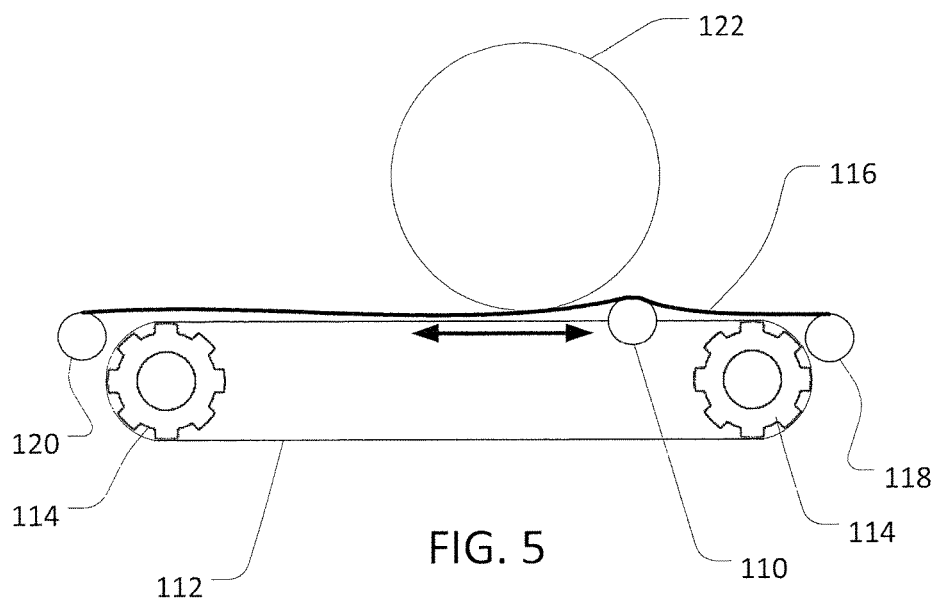
FIG. 5 is a side schematic view of an example configuration of a motive member and flexible member for the crop-package transfer system of FIG. 1.

In various embodiments of the disclosed crop-package transfer system, the motive members and flexible members may be configured in a variety of ways. In certain embodiments, a motive member may be configured to travel over a cyclical path, such as an endless loop, in order to impart motive force to a bale via an intervening flexible member. Referring to FIG. 5, for example, a motive member 110 (e.g., configured as a bar or roller) is attached to an endless belt 112. Gears 114 or other devices may be actuated by an actuator device (not shown), such as an electric motor or a gear train or chain drive driven by a power take-off shaft of a baler, in order to move the motive member 110 along the path of the belt 112. A flexible member 116, such as a draped sheet or belt, is disposed between attachment points 118 and 120 on a support frame, such that as the gears 114 move the motive member 110 via the belt 112, the motive member moves a bale 122 via the flexible member 116.

Figure 6:
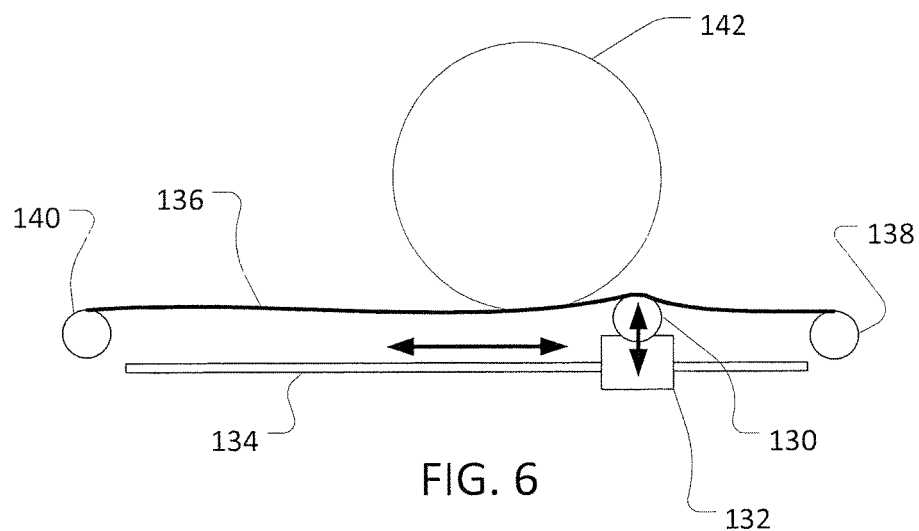
FIG. 6 is a side schematic view of another example configuration of a motive member and flexible member for the crop-package transfer system of FIG. 1.

In certain embodiments, a motive member may be mounted on a slide or an extendable support. Referring to FIG. 6, for example, a motive member 130 is mounted via a platform 132 to a slide or track 134. A flexible member 136, such as a belt or strap, is disposed above the motive member 130 and supported with respect to a support frame (not shown) at attachment points 138 and 140. An actuator device (not shown), such as an electric or hydraulic machine, may be configured to move the platform 132 along a front-to-rear (and vice versa) path, in order to transport a bale 142 supported by the flexible member 136 along the support frame. In certain embodiments, the actuator device may be further configured to move the motive member 130 vertically, with respect to the support frame, in order to provide a lifting force to the bale 142 via the flexible member 136. For example, a hydraulic cylinder (not shown) may be mounted to the platform 132 and may be configured to extend, in order to raise the motive member 130 and the bale 142, as the platform 132 moves rearward (i.e., to the right, as depicted) along the support frame.

Figure 7A:
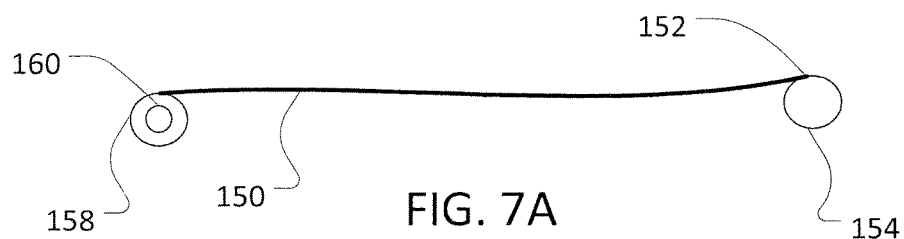
FIGS. 7A and 7B are side schematic views of yet another example configuration of a motive member and flexible member for the crop-package transfer system of FIG. 1.
Figure 7B:
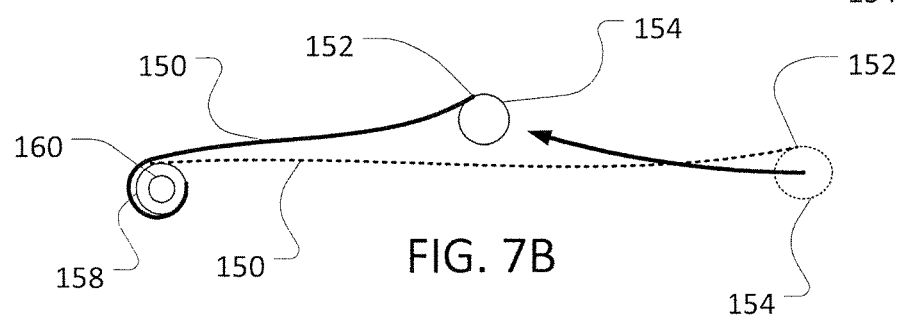

In certain embodiments, an end of the flexible member may be attached to the motive member, such that the motive member moves the end of the flexible member as the motive member moves the bale. In the embodiment depicted in FIGS. 7A and 7B, for example, a flexible member 150 extends between a first (forward) attachment point 152 at a motive member 154 and second (rearward) attachment point at a spool 158. As the motive member moves vertically upward and rearward (see FIG. 7B, depicting the configuration of the features from FIG. 7A in dotted relief), the flexible member 150 winds around the spool 158, such that excess slack in the flexible member 150 is taken up by the spool 158. When the motive member 154 moves forward again (e.g., to the position depicted in FIG. 7A), the flexible member 150 may then re-lengthen by unwinding from the spool 158. at rear attachment may wind up belt as the motive member moves, such that the belt shortens. In certain embodiments, a torsion spring 160 (or other biasing element) may be provided at the spool 158, in order to provide appropriate tension to the flexible member 150 and to cause the spool 158 to automatically wind the flexible member 150 during rearward movement of the motive member 154.

Figure 8A:
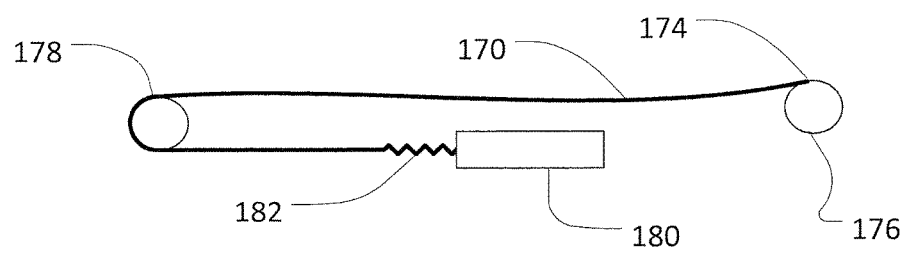
FIGS. 8A and 8B are side schematic views of still another example configuration of a motive member and flexible member for the crop-package transfer system of FIG. 1.
Figure 8B:
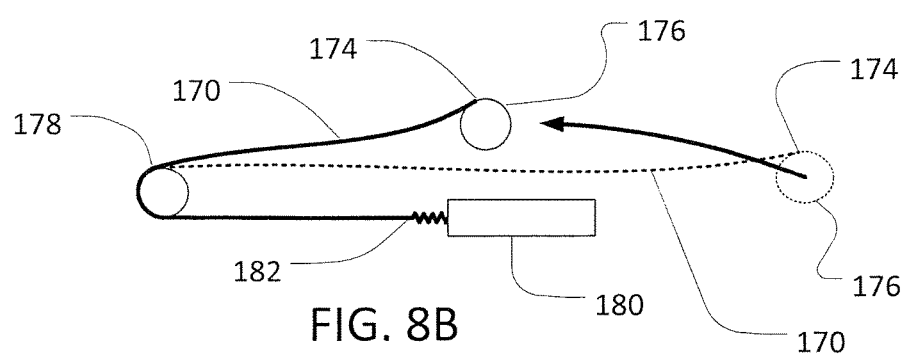

As another example, in the embodiment depicted in FIGS. 8A and 8B, a flexible member 170 extends between a first (forward) attachment point 174 at a motive member 176 and second (rearward) attachment point 178 at a roller or cylindrical bar. As depicted, the flexible member 170 extends around the roller or bar at the attachment point 178 to a biasing assembly 180. Generally, a biasing assembly such as the assembly 180 may be configured to apply tension to a flexible member in order to urge the flexible member in a particular direction or toward a particular effective working length. As depicted, the biasing assembly 180 includes a spring 182 configured to shorten and lengthen, corresponding to a shortening and lengthening, respectively, of the effective working length of the flexible member 170. It will be understood, however, that other configurations may be possible. For example, a hydraulic assembly (e.g., a hydraulic actuator and control circuit) may additionally (or alternatively) be included in the biasing assembly 180.

In the embodiment depicted in FIGS. 8A and 8B, as the motive member 176 moves vertically upward and rearward (see FIG. 8B, depicting the configuration of the features from FIG. 8A in dotted relief), the spring 182 shortens, such that the flexible member 170 is pulled around the roller or bar at the attachment point 178 and the effective working length of the flexible member 170 between the attachment points 174 and 178 decreases. When the motive member 176 moves forward again (e.g., to the position depicted in FIG. 8A), the spring 182 may then lengthen, such that the effective working length of the flexible member 170 extends.

As in other examples presented herein, the particular path of a particular motive member may vary depending on the configuration of the motive member, the relevant actuator device, and other components of the crop-package transfer system (or other systems). For example, the motive members 154 and 176 of FIGS. 7 and 8 may be moved along linear paths (e.g., by hydraulic actuators or platform-and-slide arrangements), along arcuate paths (e.g., by a pusher arm of a baler or various pivoting linkages) or along various other paths. In this light, although the path of the motive member 154 is depicted as concave upwards and the path of the motive member 176 is depicted as concave downward, other paths may be possible for either motive member 154 and 176.

In certain embodiments, an actuator device may transmit force to a motive member via an intermediate member, such that the motive member receives force from the actuator device indirectly. In certain embodiments, such an intermediate member (or a motive member itself) may be pivotally attached to the support frame of the crop-package transfer system (or another structure), such that the motive member is moved along an arcuate path by the actuator device.

Figure 9A:
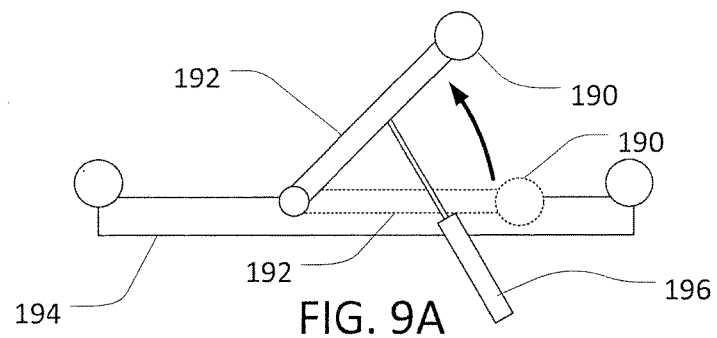
FIGS. 9A-9C are side schematic views of example embodiments of the crop-package transfer system of FIG. 1 with motive members pivotally attached to a support frame.

Referring also to FIG. 9A, for example, a motive member 190 is supported on an intermediate member configured as a pivoting arm 192 that is pivotally attached to a support frame 194. (The relevant flexible members are not shown in FIG. 9A, for clarity of presentation.) A hydraulic cylinder 196 (or other actuator device) is configured to impart a motive force to the arm 192 in order to pivot the arm 192, with respect to the support frame 194, between first and second positions (depicted in dotted and solid relief, respectively).

Figure 9B:
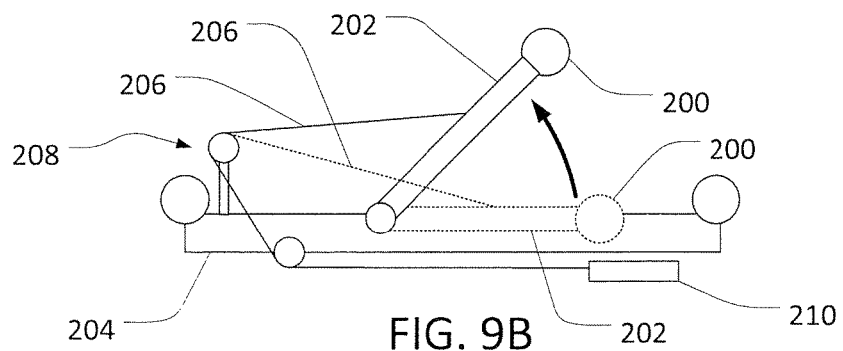

In a similar configuration, referring also to FIG. 9B, a motive member 200 is supported on an intermediate member is configured as a pivoting arm 202 that is pivotally attached to a support frame 204. (The relevant flexible members are not shown in FIG. 9B, for clarify of presentation.) A cable 206 (or similar element) extends from the arm 202 through a pulley arrangement 208 to an actuator device 210 (e.g., a powered spool, a biasing assembly, a hydraulic cylinder, and so on). The actuator device 210 is configured to impart a motive force to the arm 202 via the cable 206 and pulley arrangement 208, in order to pivot the arm between first and second positions (depicted in dotted and solid relief, respectively). As depicted, the pulley arrangement 208 and actuator device 210 are disposed entirely on the support frame 204. In certain embodiments, part or all of the pulley arrangement 208 and actuator device 210 may be disposed on an associated baler or other structure. For example, a pulley arrangement similar to the pulley arrangement 208 may be utilized to transmit motive force from a baler gate (see, e.g., FIG. 4B) to a motive member.

Figure 9C:
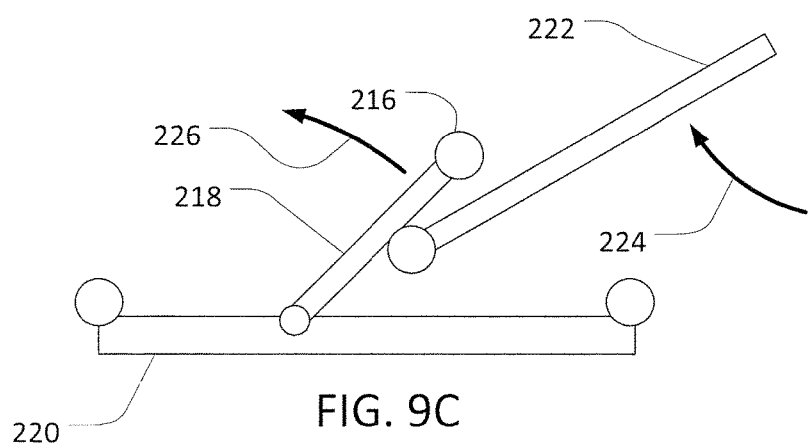

In yet another configuration, referring also to FIG. 9C, a motive member 216 is supported on an intermediate member configured as a pivoting arm 218 that is pivotally attached to a support frame 220. (The relevant flexible members are not shown in FIG. 9C, for clarity of presentation.) A pusher arm 222 (or other member) is configured to engage the pivoting arm 218, such that when the pusher arm 222 is moved by an actuator device (not shown), the pusher arm 222 moves the motive member 216 via the pivoting arm 218. In this way, for example, an upwardly concave path of travel 224 imparted by the actuator device to the pusher arm 222 may be transmitted to a bale (not shown) via a downwardly concave path of travel 226 of the motive member 216. The pusher arm 222 may be pivotally attached to an associated baler (not shown), as in the embodiment of FIGS. 4A and 4B, or may be attached to various other structures.

Figure 11:
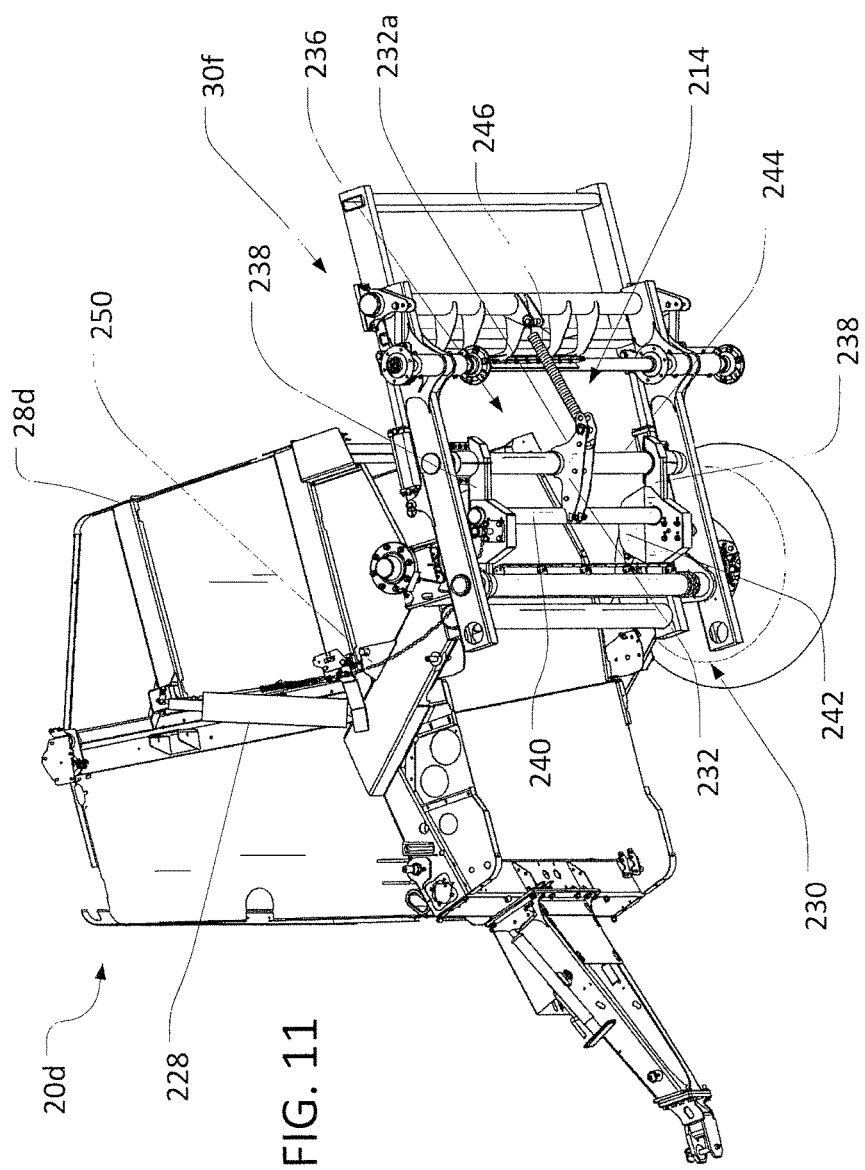
FIG. 11 is a perspective view of the bottom of the baler and crop-package transfer system of FIG. 10.

Referring also to FIGS. 10 and 11, another example crop-package transfer system 30f is depicted. In the embodiment depicted, a support frame 230 is attached to and supported by the frame of a baler 20d, such that the crop-package transfer system 30f moves integrally with the baler 20d. A motive member for the system 30f is configured as a bar 234 (e.g., a fixed or rotating bar), over which various belts or other flexible members may be disposed. (The various flexible members are not depicted in FIG. 10 for clarity of presentation.) In this way, similarly to the motive members of the embodiments discussed above, the bar 234 may provide motive force via the various belts (or other flexible members) to a bale received from the baler 20d, and may thereby cause the bale to tend to move along with support frame 230 with a rolling motion.

The bar 234 is supported with respect to the support frame 230 with a pivoting intermediate member assembly 236, which includes side members 238, lateral support 240, and side guards 242. The side members 238 are fixed to a pivot bar 244, such that an actuator device (e.g., a set of hydraulic actuators 228) may be utilized to pivot the assembly 236 and, thereby, the bar 234, with respect to the support frame 230. In this way, a bale supported by the support frame 230 may be moved rearward and, in certain embodiments, vertically upward) along the support frame 230 by the bar 234. In certain embodiments, the lateral support 240 may also serve to support a bale (e.g., when the bale is first received from the baler 20d). In certain embodiments, the side guards 242 may help to prevent lateral movement of the bale when the bale is supported on the support frame 230.

In certain embodiments, including as depicted, the actuator device 228 for the crop-package transfer system 30f may be configured to pivot a gate 28d of the baler 20d to release a bale from the baler 20d. Attachment members, such as chains 250 may extend from the gate 28d to the intermediate member assembly 236, such that as the gate 28d moves over a particular range of motion, the chains 250 (or other attachment members) may cause the assembly 236 (and the bar 234) also to move. In this way, the hydraulic actuators 228 (or another actuator device) on the baler 20d may be utilized for moving the gate 28d as well as to transport bales along the support frame 230 via the bar 234 and the various flexible members.

Referring in particular to FIG. 11, a biasing assembly 214 may be provided to assist in returning the assembly 236 (and the bar 234) from the raised orientation depicted in FIG. 10. In the embodiment depicted, for example, the assembly 214 includes a bracket 232 attached to the pivot bar 244 and to the lateral support 240, with a portion 232a of the bracket 232 extending downward and rearward from the pivot bar 244. A tension spring 246 (or other biasing element) is attached to the bracket portion 232a and to an attachment point 248 on the support frame 230 (or another structure). In this way, when the assembly 236 is pivoted upward, the spring 246 elongates and thereby imposes a biasing force on the assembly 236 to return the assembly 236 from the raised configuration.

In certain embodiments, multiple motive members may be provided for a crop-package transfer system, with each of the motive members being configured to move a bale over at least part of a path of travel of the bale. In certain embodiments, such motive members may move a bale cooperatively and, at least in part, simultaneously. In certain embodiments, such motive members may move a bale separately (e.g., in sequence).

Figure 12A:
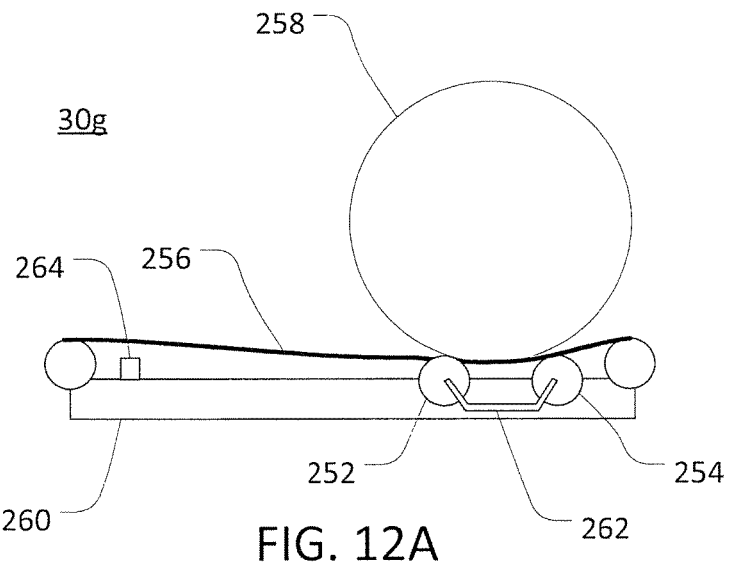
FIGS. 12A and 12B are side schematic views of an example crop-package transfer system with two motive members.
Figure 12B:
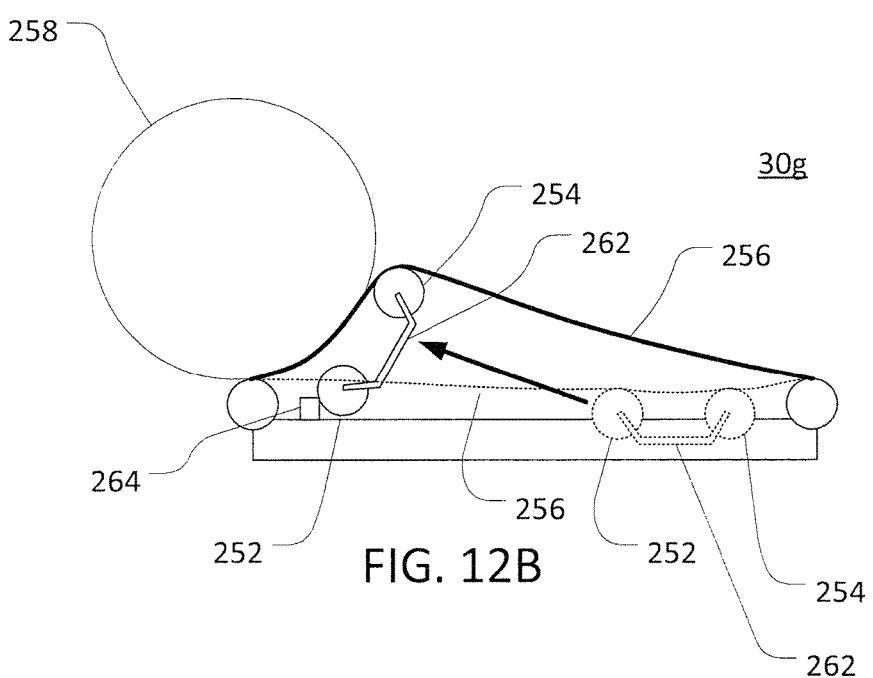

Referring to FIGS. 12A and 12B, for example, a crop-package transfer system 30g with a support frame 260 is configured with a pair of motive members 252 and 254, each of which is disposed along a set of flexible belts 256 opposite a support surface 256a for a bale 258. The motive members 252 and 254 may be supported by a common support structure such as a cradle 262 (as depicted), or may be supported on the support frame 260 relatively independently of each other.

As depicted in FIG. 12A, the motive members 252 and 254 are configured to each support the bale 258, at least in part, when the bale 258 is received on the device 30g. In certain embodiments, however, only one of the motive members 252 and 254 may initially support the bale 258. As the motive members 252 and 254 are moved rearwardly (i.e., to the left, as depicted) along the support frame 260, the motive members 252 and 254 may continue, for a time, to both support and move the bale 258. Eventually, however, only one of the members 252 and 254 (or each of the members 252 and 254, but individually and in sequence) may support and move the bale 258. As depicted in FIG. 12B, for example, as the motive members are moved rearward along the device 30g by an actuator device (not shown), the motive member 252 (or a part of a cradle 262 for the member 252) may eventually contact a stop 264 or other structure disposed along the support frame 260. This (or a similar event) may cause the cradle 262 to pivot upwards, such that the motive member 254 continues to support and move the bale 258, but the motive member 252 does not. (As in various other figures, an initial orientation of various features is indicated in FIG. 12B with dotted relief, and a later orientation is indicated with solid relief.) In this regard, for example, the motive member 252 may be utilized primarily to move the bale 258 rearwardly along the support frame 260, while the motive member 254 may be utilized to move the bale 258 both rearwardly along the support frame 260 and vertically upwards near the rearward portion of the support frame 260.

In certain embodiments, various flexible members of a crop-package transfer system may be configured to move relative to one another. This may be useful, for example, in order to tilt, turn, or otherwise move a bale upon the relevant support frame. In certain embodiments, various flexible members may be configured to move relative to one another at the attachment points of the bales to the support frame.

Figure 13A:
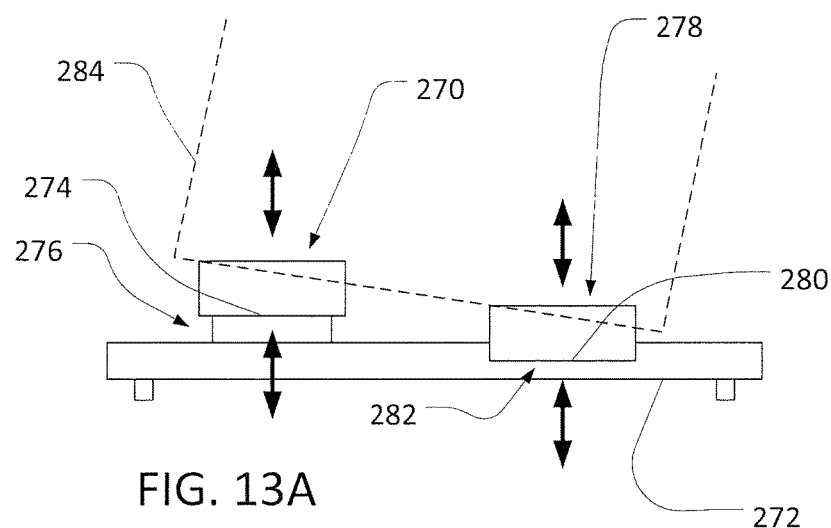
FIGS. 13A and 13B are rear and top schematic views, respectively, of example crop-package transfer systems with independently movable flexible members.

Referring also to FIG. 13A, for example, a first flexible member 270 may be attached to a support frame 272 at a first attachment point 274 with a first attachment device 276. The attachment device 276 may include, for example, a spool, a clamp, a pinned arrangement, or other configuration for attaching the flexible member 270 to the support frame 272. A second flexible member 278 may be attached to the support frame 272 at a second attachment point 280 with a second attachment device 282. The attachment device 282 may also include, for example, a spool, a clamp, a pinned arrangement, or other configuration for attaching the flexible member 270 to the support frame 272. The attachment devices 276 and 282 may be configured to move relative to the support frame 272, such that the attachment points 274 and 280 move relative to one another. As depicted, the attachment devices 276 and 282 may be moved vertically up and down, such that the attachment points 274 and 280 may be raised and lowered, relative to one another. This may be useful, for example, in order to impart a degree of tilt to a bale 284, which may cause the bale 284 to roll along the support frame 272 in a slanted or curved path. In other embodiments, the attachment devices 276 and 282 may additionally (or alternatively) be configured to move in other ways, including laterally across the support frame 272.

Figure 13B:
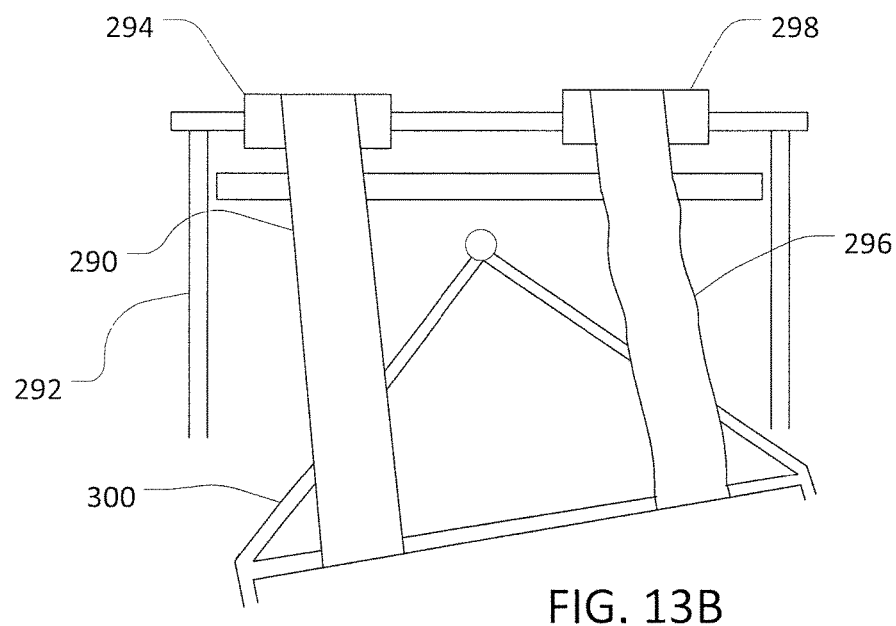

As another example, referring also to FIG. 13B, various flexible members of a crop-package transfer system may be configured to extend to different effective working lengths, relative to a support frame and each other. For example, a first flexible member 290 may be extendably attached to a support frame 292 at a first spool 294, and a second flexible member 296 may be extendably attached to the support frame 292 at a second spool 298. The flexible members 290 and 296 may also be attached, opposite the support frame 292, to a trailer 300 configured to pivot, at a hitch point 302, relative to the support frame 292. The trailer 300 may be an accumulator, a wrapping device for crop packages, or another device.

The spools 294 and 298 (or various control systems relating thereto) may be configured to allow the flexible members 290 and 296, respectively, to extend to different effective working lengths with respect to the frame 292. For example, as a baler (not shown) towing (or otherwise attached to) the support frame 292 turns in a first direction, the trailer 300 may pivot relative to the support frame 292. Accordingly, the effective distance between attachment points on the trailer 300 and on the support frame 292 may be changed by a different amount for the flexible member 290 than for the flexible member 296. As depicted, for example, a right turn by the baler may result in a shorter effective distance between attachment points for the flexible member 296 than for the flexible member 290. In such a case, a resulting relative slackening of the flexible member 296 (e.g., as facilitated by the spool 298 not fully capturing the relative excess length of the flexible member 296) may help to direct a crop package (not shown in FIG. 13B) at an angle to the support frame 292. Accordingly, the crop package may be properly moved onto the trailer 300 despite the trailer 300 having pivoted relative to the support frame 292.

Relative slackening of either (or both) of the flexible members 290 and 296 may be achieved in various ways. In some embodiments, as noted above, the spools 294 and 298 may be configured not to fully take up slack in the flexible members 290 and 296, respectively, that results from a pivoting of the trailer. In this way, for example, the effective tension of the flexible member 290 may be caused to differ from the effective tension of the flexible member 296 such that a bale supported on and moved by the flexible members 290 and 296 may tend to move toward one or the other side of the support frame 292. In some embodiments, the spools 294 and 298 may be actively controlled to vary the effective length (and tension) of the flexible members 290 and 296, such that a crop package may be appropriately directed (e.g., directed at an angle onto the trailer 300). In some embodiments, the spools 294 and 298 may be configured to vary the effective length (and tension) of the flexible members 290 and 296, sometimes even in the absence of the trailer 300 pivoting relative to the support frame 292.

Figure 14:
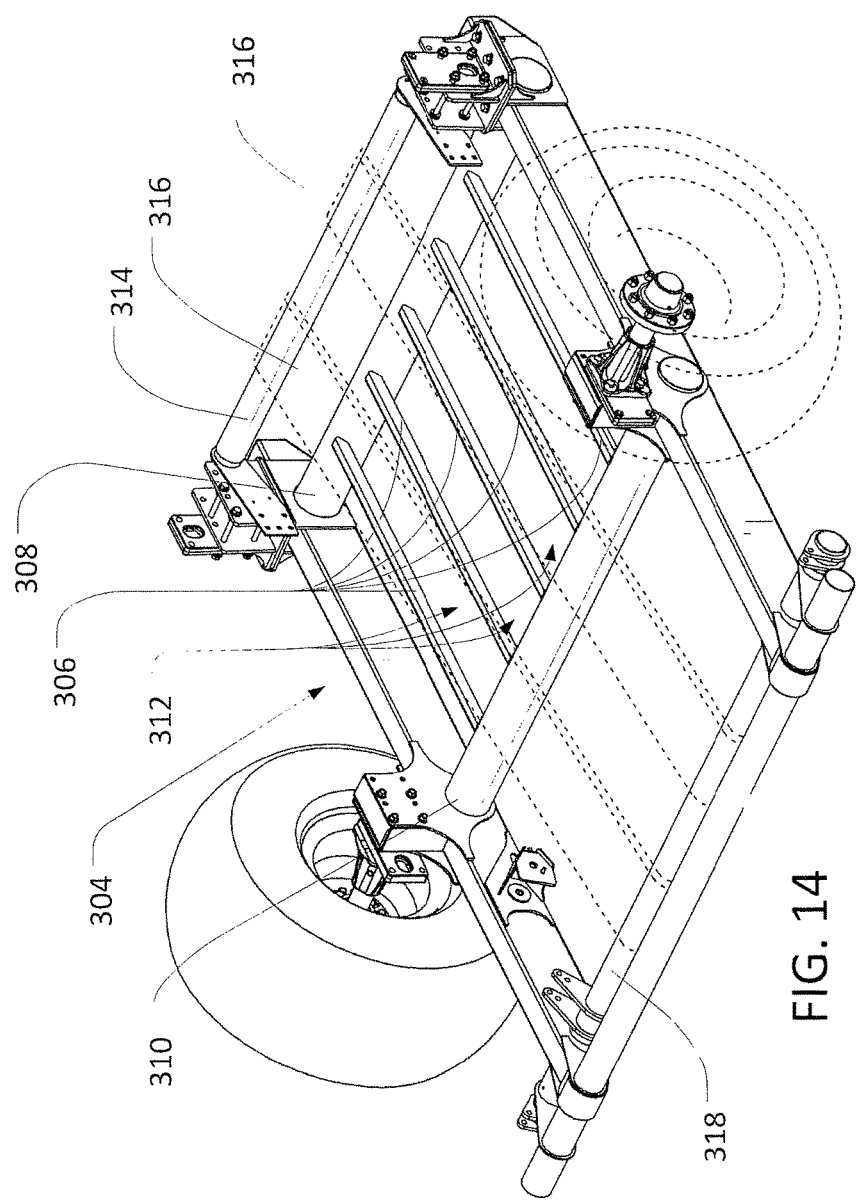
FIG. 14 is a perspective view of an example support frame for the crop-package transfer system of FIG. 1.

As noted above, the support frame of a crop-package transfer system may be configured in various ways. Referring also to FIG. 14, in certain embodiments, a support frame 304 may include a series of rearwardly extending rigid bars 306 disposed toward the front end 304a of the support frame 304. As depicted, for example, the rigid bars 306 extend over a portion of the length of the support frame 304, between lateral supports 308 and 310. Various openings 312 are provided between the bars 306, as may be useful to allow material from a supported bale (not shown) to fall to the ground without excessive accumulation on the support frame 304. A motive member configured as a roller 314 is also provided, with various flexible belts 316 attached to the roller 314 and to a bar 318 at a rear end 304b of the support frame 304. In the configuration depicted, a bale (not shown) may fall from the baling chamber of a baler (not shown) onto the belts 316 and the rigid bars 306. While the bale is disposed above the rigid bars 306, the bale may continue to be supported by the bars 306 with respect to the support frame 304. As the roller 314 (i.e., the motive member) moves the bale rearwardly, however, the bale may pass over the lateral support 310 such that the bale is no longer supported by the rigid bars 306.

Figure 15:
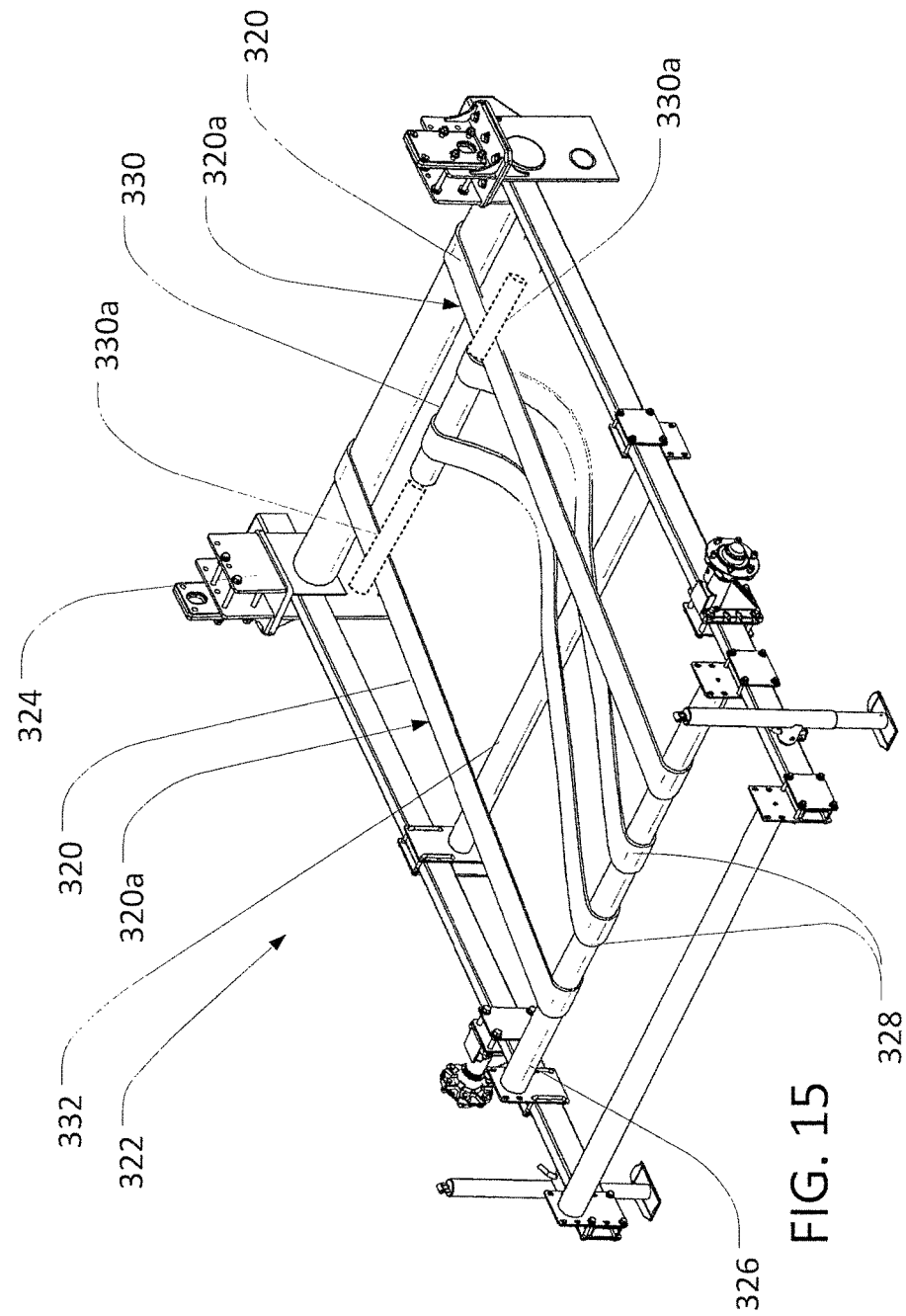
FIG. 15 is a perspective view of another example support frame for the crop-package transfer system of FIG. 1.

Referring also to FIG. 15, in certain embodiments, a set of relatively tightly stretched (or "tightened") flexible members may be provided along with a set of relatively slackly supported flexible members. As depicted, for example, a set of tightened belts 320 is attached to a support frame 322 at forward and rearward lateral supports 324 and 326. A set of relatively slack belts 328 is also attached at one end of the belts 328 to the support frame at the rearward lateral support 326, but is attached at the opposite end of the belts 328 (i.e., near the front of the support frame 322) to a motive member configured as a bar 330. A further lateral support 332 of the support frame 322 may help to prevent the slackened belts 328 from hanging too far towards the ground.

During an example operation, a bale (not shown) received from a baler (not shown) may initially be supported by the relatively tightly stretched belts 320. As an actuator device (not shown) starts to move the bar 330 to move the bale, the bale may then be supported by both the tightly stretched belts 320 and the slack belts 328, as moved by the bar 330. As the bar 330 continues to move the bale, the bale may continue to be supported by both sets of belts 320 and 328, or may eventually be supported only by the belts 328 that are moved by the bar 330.

It will be understood that other configurations are possible. In certain embodiments, for example, portions 330*a* of the bar 330 (or another motive member) may extend over a portion of the belts 320, such that the bar 330 is disposed on the same side of the belts 320 as the support surface 320*a* of the belts 320. As another example, the slack and tightened belts 328 and 320 may be arranged in other way with respect to each other (and other relevant structures). For example, the slack belts 328 may be arranged alternately with the tightened belts 320, or the depicted locations of the belts 320 and 328, respectively, may be interchanged such that the slack belts are disposed laterally outside of the tightened belts 320. As still another example, the slack belts 328, although still configured to be moved by the bar 330, may be attached to the support frame 322 at the forward lateral support 324, similarly to the tightened belts 320.

Various example configurations of a crop-package transfer system, and associated components, are discussed in detail above. It will be understood that other configurations may be possible, in the spirit of this disclosure. It will further be understood that various features from certain examples may be interchanged or combined with various features from other examples, in order to provide alternative embodiments of a crop-package transfer system. For example, the various belt and support arrangements depicted in FIGS. 13-15 may be used with various of the motive member and actuator device configurations depicted in FIGS. 4-9.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A crop-package transfer system comprising:
a support frame disposed downstream from a crop-packaging device having a chamber between opposite side walls, such that when a crop package is ejected from the chamber out from between the side walls of the crop-packaging device, the crop package moves onto the support frame, wherein the support frame is disposed between the crop-packaging device and a trailing device;
at least one flexible member supported by the support frame, the crop-package transfer system being configured to support a crop package with the crop package on a first side of the at least one flexible member; and
a motive member disposed on a second side of the at least one flexible member; and an actuator device configured to move the motive member along the second side of the at least one flexible member, such that the motive member transmits motive force from the actuator device to the crop package via the at least one flexible member to transfer the crop package from the crop-packaging device to the trailing device; and wherein the motive member moves the crop package along the at least one flexible member over at least one of a rearward path and a vertical path.

2. The crop-package transfer system of claim 1, wherein a working length of the at least one flexible member with respect to the support frame increases as the motive member moves the crop package.

3. The crop-package transfer system of claim 2, wherein a first end of the at least one flexible member is attached to the support frame with a rolling member, such that the at least one flexible member unrolls from the rolling member as the motive member moves the crop package.

4. The crop-package transfer system of claim 2, wherein a biasing assembly applies tension to the at least one flexible member to resist the increase in the working length of the at least one flexible member.

5. The crop-package transfer system of claim 4, wherein the biasing assembly includes one or more of a spring assembly and a hydraulic actuator.

6. The crop-package transfer system of claim 1, further comprising: an attachment member attached to the crop-packaging device, wherein the actuator device is configured to move the motive member via the attachment member.

7. The crop-package transfer system of claim 6, wherein the attachment member is attached to a rear gate of the crop-packaging device; and
wherein the actuator device is configured to move the rear gate, in order to move the motive member via the attachment member.

8. The crop-package transfer system of claim 6, further comprising:

an intermediate member attached to one of the support frame and the crop-packaging device;
wherein the actuator device moves the motive member via the attachment member by the attachment member moving the intermediate member.

9. The crop-package transfer system of claim 8, wherein the intermediate member is pivotally attached to the one of the support frame and the crop-packaging device.

10. The crop-package transfer system of claim 9, wherein the motive member is pivotally attached to the support frame, such that the intermediate member moves the motive member in an arcuate path, in order to move the crop package via the at least one flexible member.

11. The crop-package transfer system of claim 1, wherein the motive member includes one or more of a roller configured to move along the second side of the at least one flexible member, and a bar configured to move along the second side of the at least one flexible member.

12. The crop-package transfer system of claim 1, wherein the support frame includes one or more rigid members configured also to support the crop package; and
wherein as the actuator device moves the motive member along the second side of the at least one flexible member, the motive member moves the crop package along the one or more rigid members.

13. The crop-package transfer system of claim 1, further comprising:
a second motive member disposed on the second side of the at least one flexible member;
wherein the actuator device is further configured to move the second motive member along the second side of the at least one flexible member, such that the second motive member transmits motive force from the actuator device to the crop package via the at least one flexible member.

14. The crop-package transfer system of claim 13, wherein the motive member transmits motive force from the actuator device to move the crop package in a first direction; and
wherein the second motive member transmits motive force from the actuator device to move the crop package in a second direction.

15. The crop-package transfer system of claim 1, further comprising:
at least one second flexible member supported by the support frame, the crop-package transfer system being configured to support the crop package on a first side of the at least one second flexible member;
wherein the actuator device is further configured to move the motive member along a second side of the at least one second flexible member, such that the motive member transmits motive force from the actuator device to the crop package via the at least one second flexible member.

16. The crop-package transfer system of claim 15, wherein the at least one flexible member is configured to move relative to the at least one second flexible member, in order to one or more of tilt the crop package and turn the crop package.

17. The crop-package transfer system of claim 1, wherein the at least one flexible member includes a belt extending along the support frame; and
wherein the motive member includes one or more of a bar and a roller disposed below the belt.

18. The crop-package transfer system of claim 1, wherein the support frame and the at least one flexible member are configured to define, at least in part, openings between the crop package and an area below the support frame and the at least one flexible member; and
wherein, as material falls from the crop package towards the at least one flexible member, at least a portion of the material passes through the openings to the area below.

19. A crop-package transfer system comprising:
a support frame;
at least one flexible member supported by the support frame, the crop-package transfer system being configured to support a crop package with the crop package on a first side of the at least one flexible member;
a motive member disposed on a second side of the at least one flexible member;
an actuator device configured to move the motive member along the second side of the at least one flexible member, such that the motive member transmits motive force from the actuator device to the crop package via the at least one flexible member; and
at least one second flexible member supported by the support frame, the crop-package transfer system being configured to receive the crop package and to support the crop package on a first side of the at least one second flexible member;
wherein the motive member is disposed on the first side of the at least one second flexible member, such that as the motive member transmits motive force to the crop package via the at least one flexible member, the motive member does not transmit motive force to the crop package via the at least one second flexible member.

* * * * *